(12) United States Patent
Pepper et al.

(10) Patent No.: US 8,447,525 B2
(45) Date of Patent: May 21, 2013

(54) INTERACTIVE STRUCTURAL RESTORATION WHILE INTERPRETING SEISMIC VOLUMES FOR STRUCTURE AND STRATIGRAPHY

(75) Inventors: Randolph E. F. Pepper, Beijing (CN);
Agnes Dubois, La Ferte Saint Cyr (FR);
Jimmy Klinger, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 236 days.

(21) Appl. No.: 12/845,958

(22) Filed: Jul. 29, 2010

(65) Prior Publication Data

US 2012/0029827 A1   Feb. 2, 2012

(51) Int. Cl.
*G01V 1/34*   (2006.01)
(52) U.S. Cl.
USPC ............................................. 702/16; 702/11
(58) Field of Classification Search
USPC ........................................ 702/11, 16; 703/10
See application file for complete search history.

(56) References Cited

U.S. PATENT DOCUMENTS

2008/0140319 A1   6/2008   Monsen
2009/0119018 A1*  5/2009   Priezzhev et al. ................ 702/11
2010/0223039 A1*  9/2010   Maliassov ......................... 703/2

OTHER PUBLICATIONS

Monsen et al, Geological Process Controlled Interpretation, Reservoir Symposium 2006, Dubai, UAE, 2006.

* cited by examiner

*Primary Examiner* — Sujoy Kundu
(74) *Attorney, Agent, or Firm* — Colin L. Wier

(57) ABSTRACT

A method for performing seismic interpretation of a subterranean formation by enabling dual-domain interpretation of seismic features in the present day depth domain and simultaneously in a structurally restored "mapped" seismic domain. Specifically, seismic interpretation is performed on structurally restored seismic volumes while concurrently viewing the interpretation results in the structural domain. This increases the interpretation confidence by improved correlation of structural deformed events to their pre-structurally deformed geometry. The method includes the ability to progressively remove structural deformation from the seismic volume, corresponding to moving back in geologic time. The interpretation can be performed in either domain (present-day structure or structurally restored to a defined geologic event), and the interpretation will be mapped to any other computed geologic age or present structural age.

20 Claims, 10 Drawing Sheets

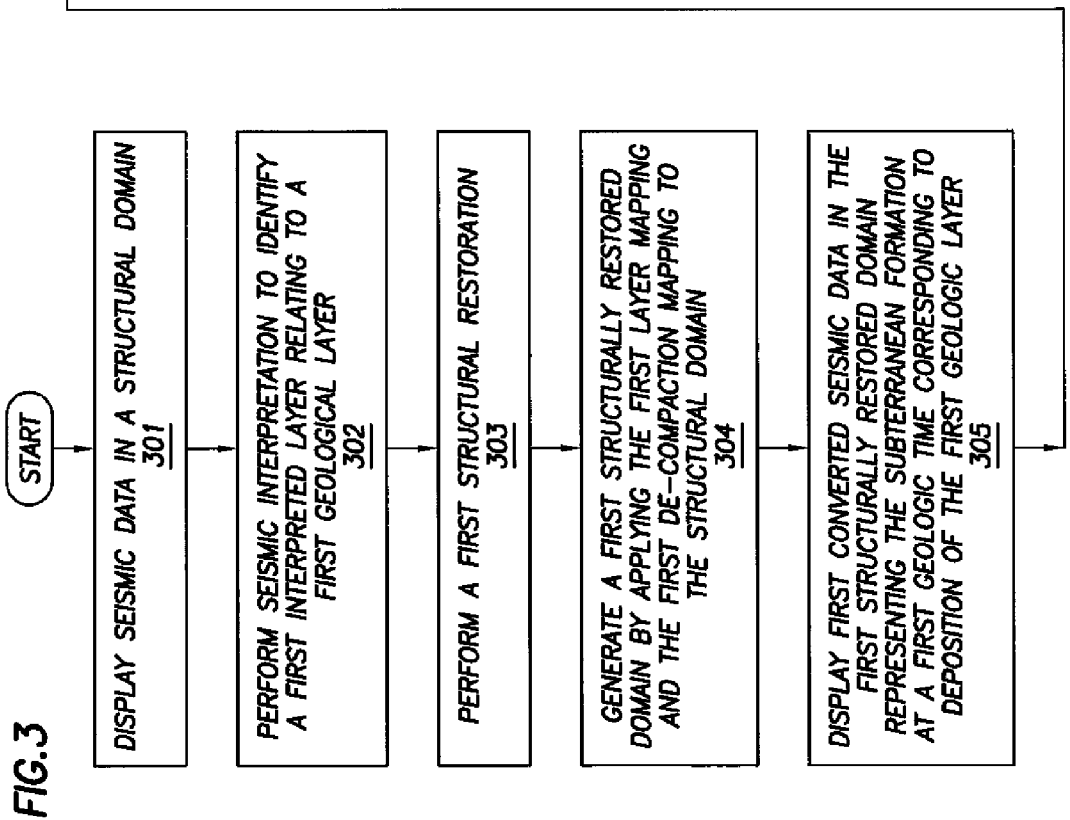

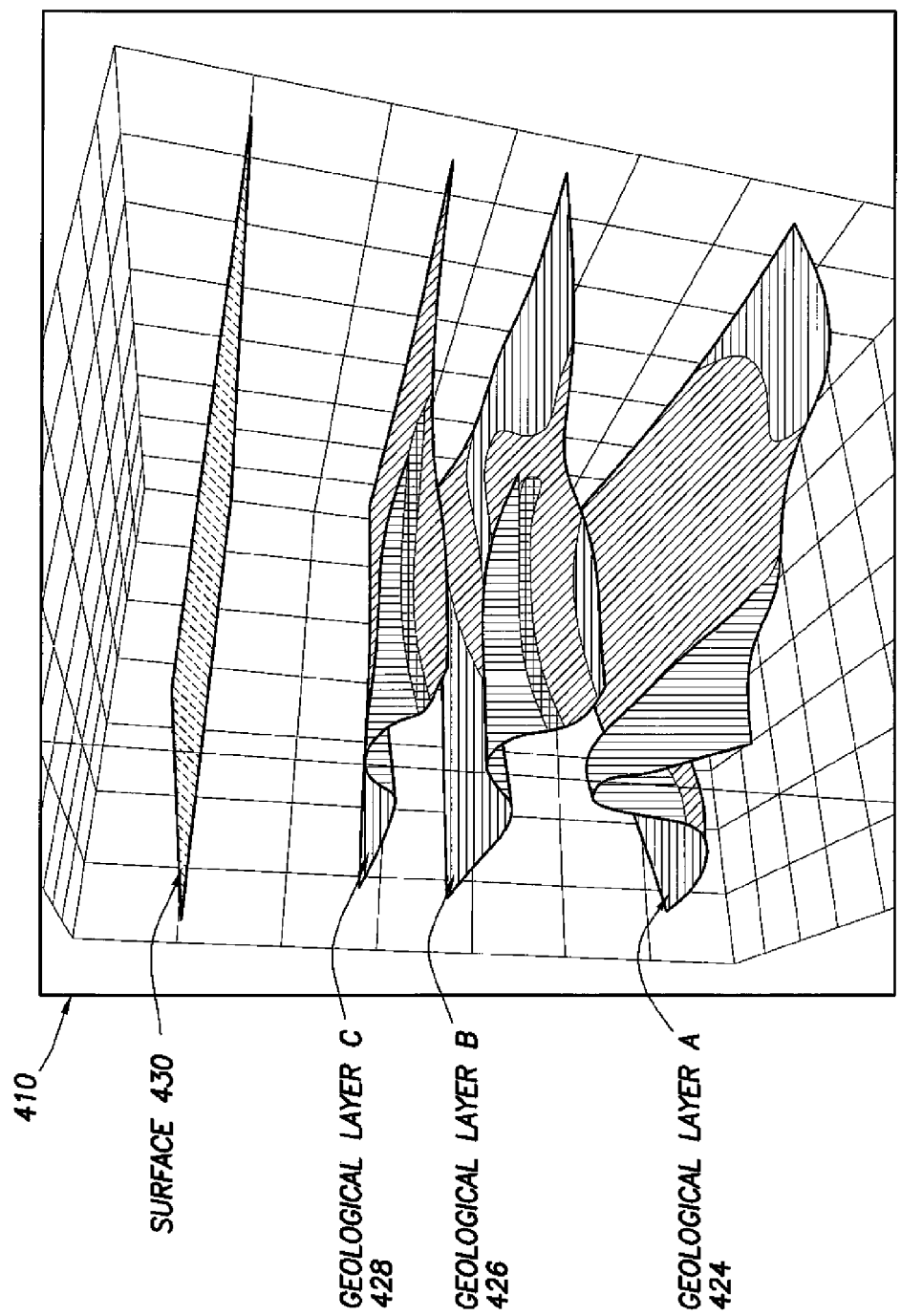
FIG.4.1

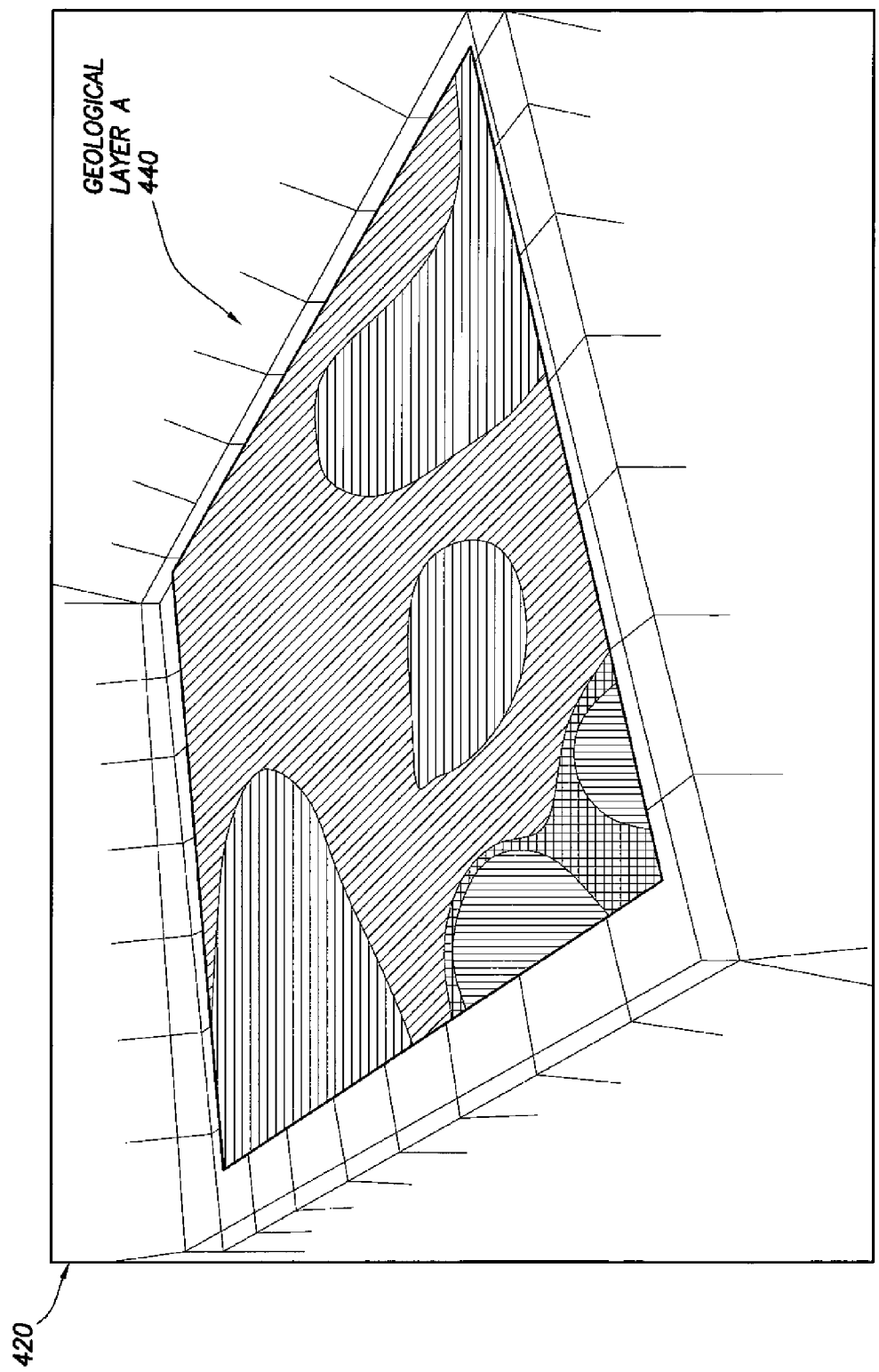
FIG.4.2

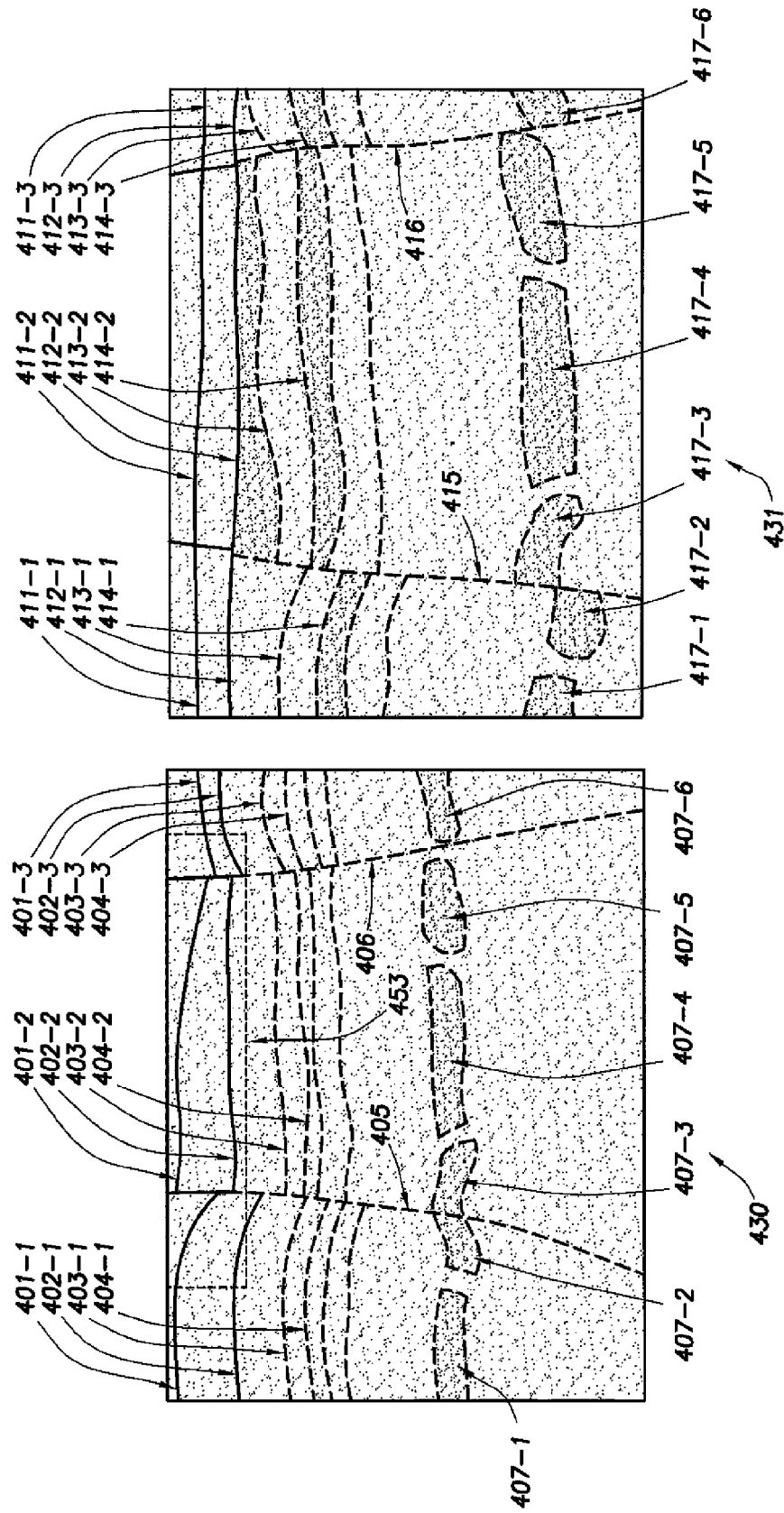
FIG.4.3

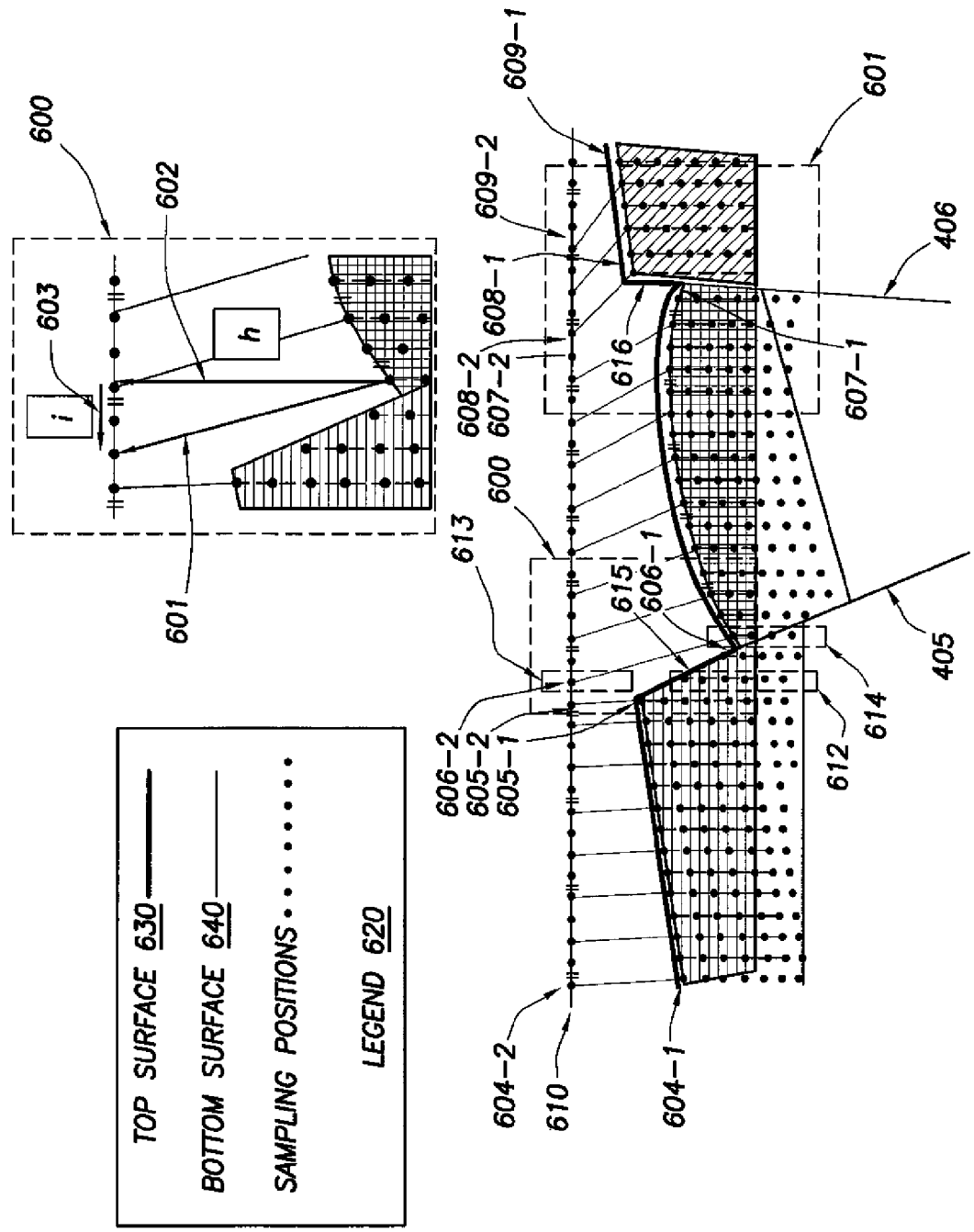
FIG. 4.4

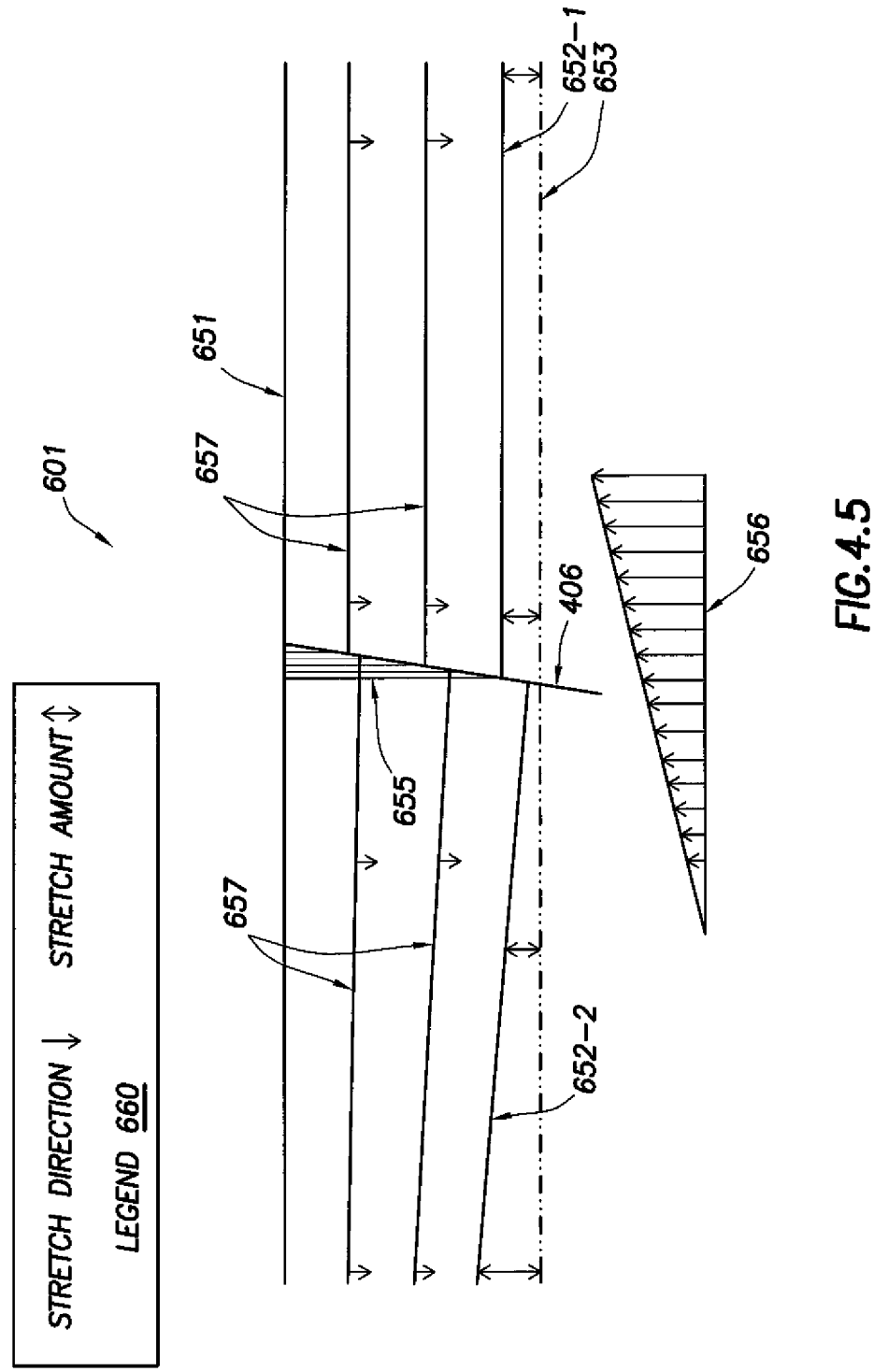
FIG. 4.5

INTERACTIVE STRUCTURAL RESTORATION WHILE INTERPRETING SEISMIC VOLUMES FOR STRUCTURE AND STRATIGRAPHY

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids. The subterranean assets are not limited to hydrocarbon such as oil, throughout this document, the terms "oilfield" and "oilfield operation" may be used interchangeably with the terms "field" and "field operation" to refer to a field having any types of valuable fluids or minerals and field operations relating to any of such subterranean assets.

During the field operations, data is typically collected for analysis and/or monitoring of the operations. Such data may include, for instance, information regarding subterranean formations, equipment, and historical and/or other data. Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

The data may be used to predict downhole conditions and make decisions concerning field operations. Such decisions may involve well planning, well targeting, well completions, operating levels, production rates and other operations and/or operating parameters. There are usually a large number of variables and large quantities of data to consider in analyzing field operations. It is, therefore, often useful to model the behavior of the field operation to determine the desired course of action. During the ongoing operations, the operating parameters may be adjusted as field conditions change and new information is received. Techniques have been developed to model the behavior of various aspects of field operations, such as geological structures, downhole reservoirs, wellbores, surface facilities, as well as other portions of the field operation.

Seismic surveying is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of such strata. Seismic data, as collected via the receiver, within a volume of interest is referred to as seismic volume. A seismic volume can be displayed as seismic images based on different sampling resolutions and viewing orientations as well as subject to various different seismic amplitude processing techniques to enhance or highlight seismic reflection patterns.

Seismic images indirectly show the distribution of material deposited over large areas. The spatial (and temporal) variability of stacking patterns, or sequences, observed in seismic images relates to depositional environments and post-depositional processes, such as erosion and tectonic activity. During seismic interpretation, reflection patterns in the seismic images linking depositional environments and vertical stacking order to sequence of deposition and, thus, relative timing, enables the geological history of the subsurface to be deciphered and leads to estimation of probable sedimentary characteristics. In this manner, a potential hydrocarbon reservoir may be identified and analyzed based on interpretation and analysis of seismic reflection data. However, performing seismic data interpretation over large seismic volumes is a daunting task, particularly if done manually.

SUMMARY

In general, in one aspect, the invention relates to a method for performing seismic interpretation of a subterranean formation. The method includes displaying seismic data in a structural domain representing an interaction of seismic wave propagation with a plurality of geological layers in the subterranean formation, wherein the plurality of geological layers comprises deformations caused by a plurality of structural events, performing, in response to displaying the seismic data, a seismic interpretation to identify a first portion of the seismic data relating to a first geological layer of the plurality of geological layers, wherein the first portion of the seismic data is designated as a first interpreted layer, performing, using a processor of a computer system, a first structural restoration by determining a first layer mapping based on an effect of the deformations on the first interpreted layer, generating a first restored layer by applying the first layer mapping to the first interpreted layer for removing the effect of the deformations on the first interpreted layer, determining a first de-compaction mapping based on a compaction effect of the first geological layer on a first remaining portion of the seismic data corresponding to geological layers beneath the first geological layer in the plurality of geological layers, and generating first de-compacted seismic data by applying the first de-compaction mapping to the first remaining portion of the seismic data for removing the compaction effect of the first geological layer, generating a first structurally restored domain by applying the first layer mapping and the first de-compaction mapping to the structural domain, and displaying first converted seismic data in the first structurally restored domain representing the subterranean formation at a first geologic time corresponding to a time of deposition of the first geological layer, wherein the first converted seismic data comprises the first restored layer and the first de-compacted seismic data.

Other aspects of interactive structural restoration while interpreting seismic volumes for structure and stratigraphy will be apparent from the following description and the appended claims.

BRIEF DESCRIPTION OF DRAWINGS

The appended drawings illustrate several embodiments of interactive structural restoration while interpreting seismic volumes for structure and stratigraphy and are not to be considered limiting of its scope, for interactive structural restoration while interpreting seismic volumes for structure and stratigraphy may admit to other equally effective embodiments.

FIG. 3 shows an example method for interactive structural restoration while interpreting seismic volumes for structure and stratigraphy in accordance with one or more embodiments.

FIGS. 4.1, 4.2, and 4.3 each show an example display screenshot for interactive structural restoration while interpreting seismic volumes for structure and stratigraphy in accordance with one or more embodiments.

FIGS. 4.4 and 4.5 show example mappings for interactive structural restoration while interpreting seismic volumes for structure and stratigraphy in accordance with one or more embodiments.

DETAILED DESCRIPTION

Figure 1:
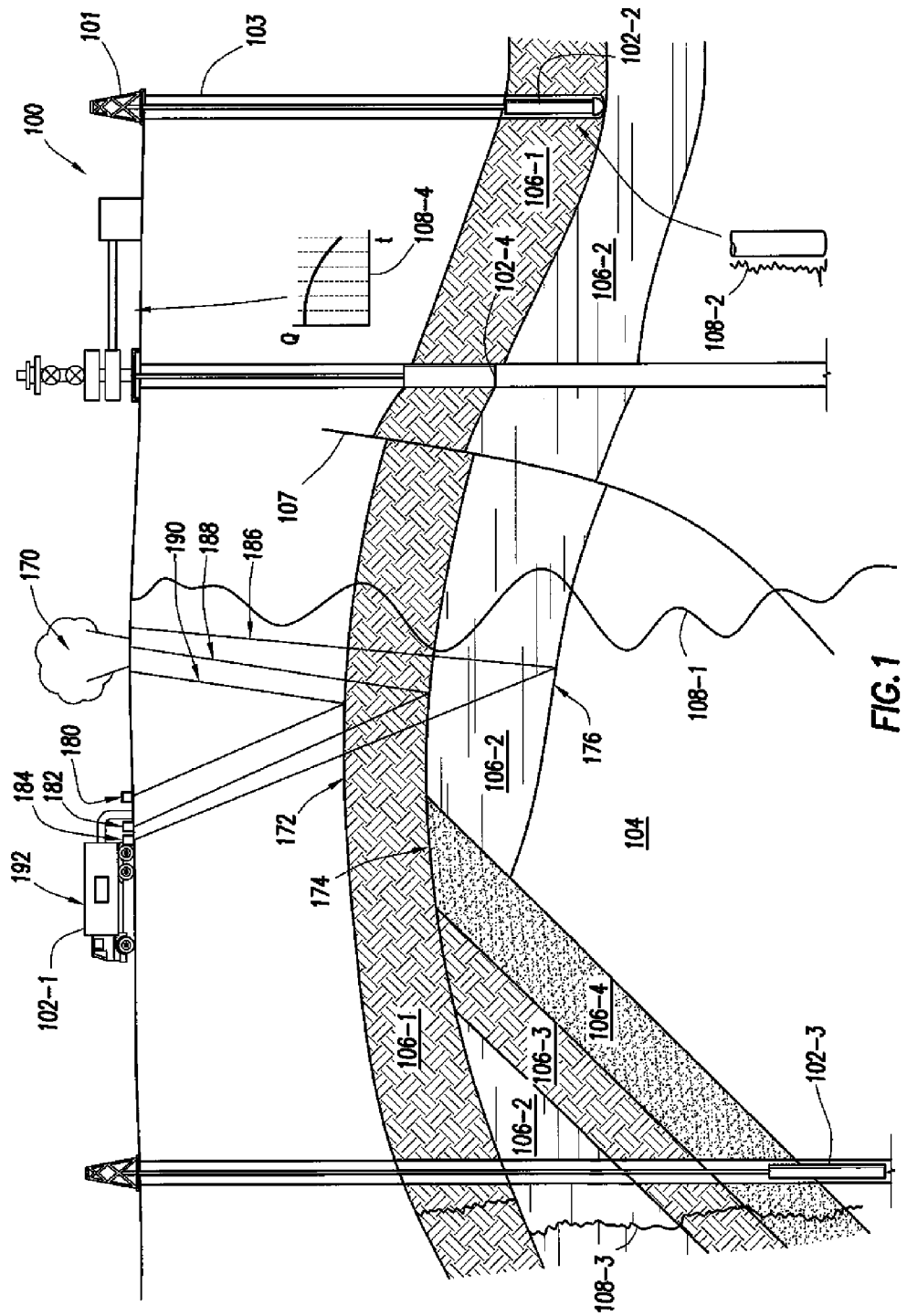
FIG. 1 is a schematic view, partially in cross-section, of a field having a plurality of data acquisition tools positioned at various locations along the field for collecting data from the subterranean formation, in which embodiments of interactive structural restoration while interpreting seismic volumes for structure and stratigraphy may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

In one or more embodiments of interactive structural restoration while interpreting seismic volumes for structure and stratigraphy, interpretation of geologic features on seismic volumes is performed by enabling dual-domain interpretation of seismic features in the present day depth domain and simultaneously in a structurally restored "mapped" seismic domain. Specifically, seismic interpretation is performed on structurally restored seismic volumes while concurrently viewing the interpretation results in the structural domain. This increases the interpretation confidence by improved correlation of structural deformed events to their pre-structurally deformed geometry. The method includes the ability to progressively remove structural deformation from the seismic volume, corresponding to moving back in geologic time. The interpretation can be performed in either domain (present-day structure or structurally restored to a defined geologic event), and the interpretation will be mapped to any other computed geologic age or present structural age.

FIG. 1 depicts a schematic view, partially in cross section of a field (100) having data acquisition tools (e.g., seismic truck (102-1), drilling tool (102-2), wireline tool (102-3), and production tool (102-4)) positioned at various locations in the field for gathering data of a subterranean formation (104). As shown, the data collected from the tools (102-1) through 102-4) can be used to generate data plots (108-1) through 108-4), respectively.

As shown in FIG. 1, the subterranean formation (104) includes several geological structures (106-1) through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, seismic truck (102-1) represents a survey tool that is adapted to measure properties of the subterranean formation. The survey operation is a seismic survey operation for producing sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output.

As shown in FIG. 1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (not shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed, and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data, or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static and/or dynamic properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
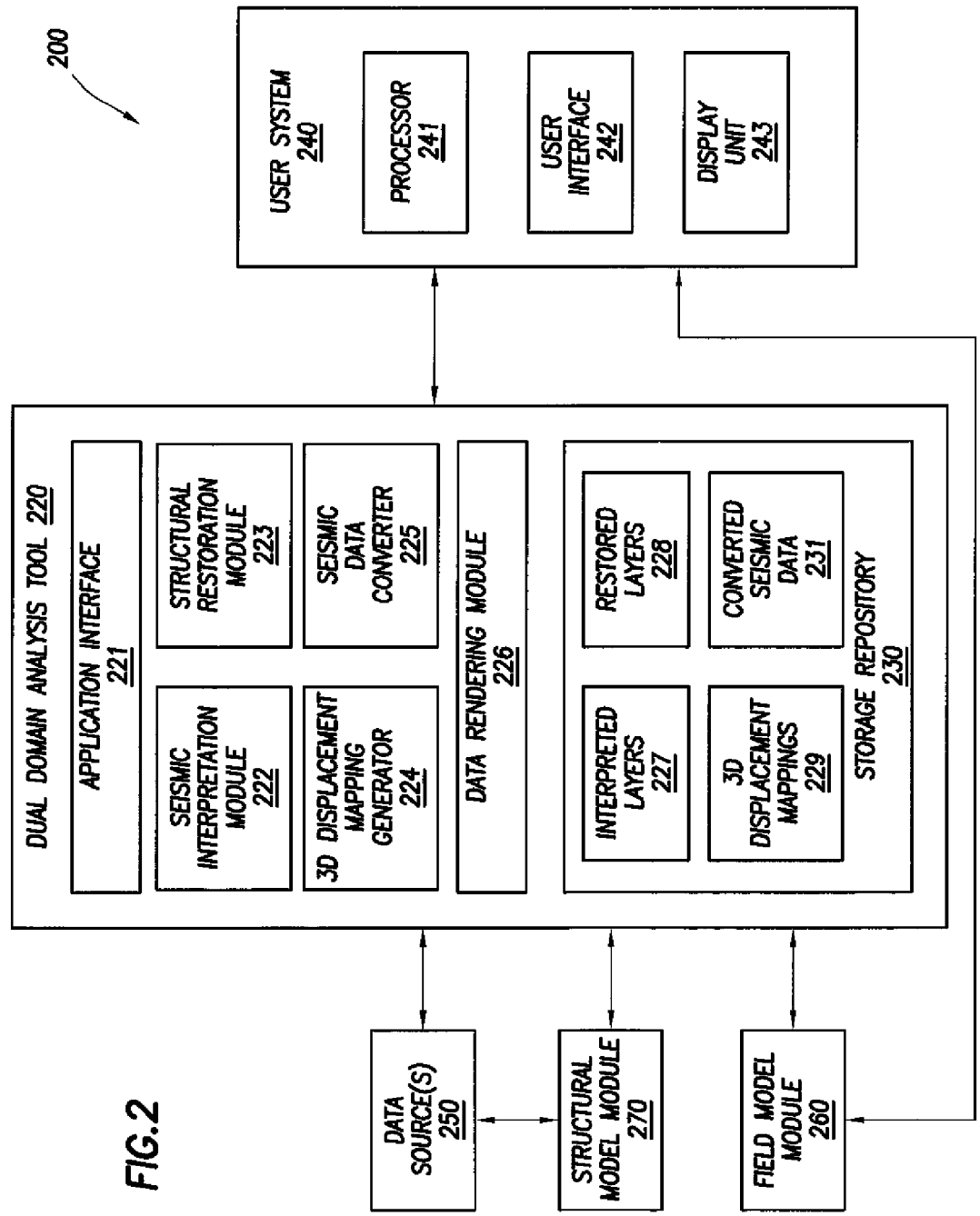
FIG. 2 shows a system in which one or more embodiments of interactive structural restoration while interpreting seismic volumes for structure and stratigraphy may be implemented.

FIG. 2 shows a diagram of a system (200) to perform interactive structural restoration while interpreting seismic volumes for structure and stratigraphy in accordance with one or more embodiments. The system (200) includes a dual domain analysis tool (220), a user system (240), one or more data sources (250), a field model module (260), and a structural model module (270). The dual domain analysis tool (220) includes a storage repository (230), one or more application interfaces (221), a seismic interpretation module (222), a structural restoration module (223), a 3D displacement mapping generator (224), a seismic data converter (225), and a data rendering module (226). The user system (240) includes a processor (241), a user interface (242), and a display unit (243). Each of these components is described below. One of ordinary skill in the art will appreciate that embodiments are not limited to the configuration shown in FIG. 2.

In one or more embodiments, the dual domain analysis tool (220) is configured to interact with one or more data sources (250) using one or more of the application interface(s) (221). The application interface (221) may be configured to receive data (e.g., field data) from a data source (250) and/or store data in the storage repository (230). In addition, the application interface (221) may be configured to receive data from the storage repository (230) and deliver the data to a data source (250). A data source (250) may be one of a variety of sources providing data associated with a field. A data source (250) may include, but is not limited to, a surface unit for collecting data from the field, a computer, a database, a spreadsheet, a user, and a data acquisition tool as described above with respect to FIG. 1. The data source (250) may be configured to provide data to the application interface (221) through an automated process, such as through a web-based application, a direct feed, or some other form of automated process. Optionally, the data source (250) may require manual entry of data by a user through a user system (240) using the application interface (221).

In one or more embodiments, the dual domain analysis tool (220) is configured to interact with the structural model module (270) using one or more of the application interfaces (221). The application interface (221) may be configured to receive data (e.g., model output) from the structural model module (270) and/or store the data in the storage repository (230). In addition, the application interface (221) may be configured to receive data from the storage repository (230) and deliver the data to the structural model module (270). The structural model module (270) may use data, received from the dual domain analysis tool (220) and/or one or more data sources (250), to generate a structural model of a field. The structural model of the field produced by the structural model module (270) may be in two or three dimensions. In one or more embodiments, the structural model is used to mathematically model (e.g., using a simulation system) geological bodies within a subterranean formation. For example, the structural model may describe the characteristics of a boundary layer between rock volumes with different properties or between solid earth and the atmosphere or the hydrosphere. The structural model may also describe the lithology of deposits, or may relate to surface morphology, age (as opposed to deposit age), or depositional environment. The surfaces in the structural model may represent boundaries of volumes. The output of a structural model may be used to understand a subterranean formation. The structural model module (270) may be a device internal to the dual domain analysis tool (220). Alternatively, the structural model module (270) may be an external device operatively connected to the dual domain analysis tool (220). The structural model module (270) may be configured to provide data to the application interface (221) through an automated process, such as through a web-based application, a direct feed, or some other form of automated process. Optionally, the structural model module (270) may require manual entry of data by a user through the user system (240) using the application interface (221).

In one or more embodiments, the dual domain analysis tool (220) is configured to interact with the field model module (260) using one or more of the application interfaces (221)). The application interface (221) may be configured to receive data (e.g., model output) from the field model module (260) and/or store the data in the storage repository (230). In addition, the application interface (221) may be configured to receive data from the storage repository (230) and deliver the data to the field model module (260). The field model module (260) may use data, received from the dual domain analysis tool (220), to generate an operating plan for a field based on the output of the dual domain analysis tool (220), as described below. The field model module (260) may be a device internal to the dual domain analysis tool (220). Alternatively, the field model module (260) may be an external device operatively connected to the dual domain analysis tool (220). The field model module (260) may be configured to provide data to the application interface (221) through an automated process, such as through a web-based application, a direct feed, or some other form of automated process. Optionally, the field model module (260) may require manual entry of data by a user through the user system (240) using the application interface (221). The field model module (260) may also be configured to send data (e.g., model output) directly to the user system (240).

In one or more embodiments, the processor (i.e., central processing unit (CPU)) (241) of the user system (240) is configured to execute instructions to operate the components of the user system (240) (e.g., the user interface (242), the display unit (243)).

In one or more embodiments, the user system (240) is configured to interact with a user using the user interface (242). The user interface (242) may be configured to receive data and/or instruction(s) from the user. The user interface (242) may also be configured to deliver instruction(s) to the user. In addition, the user interface (242) may be configured to send data and/or instruction(s) to, and receive data and/or instruction(s) from, the dual domain analysis tool (220) and/or the field model module (260). Examples of a user may include, but are not limited to, an individual, a group, an organization, or some other legal entity. The user system (240) may be, or may contain a form of, an internet-based communication device that is capable of communicating with the application interface (221) of the dual domain analysis tool (220). Alternatively, the dual domain analysis tool (220) may be part of the user system (240). The user system (240) may correspond to, but is not limited to, a desktop computer with internet access, a laptop computer with internet access, a smart phone, and a personal digital assistant (PDA), or other user accessible device.

In one or more embodiments, the user system (240) may include a display unit (243). The display unit (243) may be configured to display data for user visualization. For example, the data may include those stored in the repository (230).

As shown, communication links are provided between the dual domain analysis tool (220) and the user system (240), the data source(s) (250), the structural model module (270), and the field model module (260). A communication link is also provided between the data source(s) (250) and the structural model module (270), and between the user system (240) and the field model module (260). A variety of links may be provided to facilitate the flow of data through the system (200). For example, the communication links may provide for continuous, intermittent, one-way, two-way, and/or selective communication throughout the system (200). The communication links may be of any type, including but not limited to wired and wireless.

In one or more embodiments, a central processing unit (CPU, not shown) of the dual domain analysis tool (220) is configured to execute instructions to operate the components of the dual domain analysis tool (220) (e.g., storage repository (230), the application interface (221), the seismic interpretation module (222), the structural restoration module (223), the 3D displacement mapping generator (224), the seismic data converter (225), and the data rendering module (226)). In one or more embodiments, the memory (not shown) of the dual domain analysis tool (220) is configured to store software instructions for interactive structural restoration while interpreting seismic data of a field. The memory may be one of a variety of memory devices, including but not limited to random access memory (RAM), read-only memory (ROM), cache memory, and flash memory. The memory may be further configured to serve as back-up storage for information stored in the storage repository (230).

In one or more embodiments, the dual domain analysis tool (220) is configured to obtain and store field data or data generated by various components of the dual domain analysis tool (220) in the storage repository (230). In one or more embodiments, the storage repository (230) is a persistent storage device (or set of devices) and is configured to receive field data from a data source(s) (250), the structural model module (270), the field model module (260), and/or from a user system (240) using the application interface (221). The storage repository (230) is also configured to deliver data to, and receive data from, the seismic interpretation module (222), the structural restoration module (223), the 3D displacement mapping generator (224), the seismic data converter (225), and/or the data rendering module (226). The storage repository (230) may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data for a field. The storage repository (230) may be a device internal to the dual domain analysis tool (220). Alternatively, the storage repository (230) may be an external storage device operatively connected to the dual domain analysis tool (220).

In one or more embodiments, the dual domain analysis tool (220) is configured to interact with the user system (240) using the application interface (221). The application interface (221) may be configured to receive data and/or instruction(s) from the user system (240). The application interface (221) may also be configured to deliver instruction(s) to the user system (240). In addition, the application interface (221) may be configured to send data and/or instruction(s) to, and receive data and/or instruction(s) from, the storage repository (230), the seismic interpretation module (222), the structural restoration module (223), the 3D displacement mapping generator (224), the seismic data converter (225), and/or the data rendering module (226).

In one or more embodiments, the data transferred between the application interface (221) and the data source (250), the structural model module (270), the field model module (260), and/or the user system (240) corresponds to field data, fractures, stresses and strains, and/or various models of the field. In one or more embodiments, the dual domain analysis tool (220) is configured to support various data formats provided by the data source(s) (250), the structural model module (270), the field model module (260), and/or the user system (240).

In one or more embodiments, the dual domain analysis tool (220) is configured to perform seismic data interpretation of a field using the seismic interpretation module (222). The seismic interpretation module (222) may be configured to receive seismic data from the application interface (221) and identify geological features corresponding to seismic reflection patterns. Specifically, the seismic interpretation module (222) may receive a seismic data volume of the field (as generated by one or more of the data source(s) (250)) from the application interface (221). The geological features identified by the seismic interpretation module (222) may include, but are not limited to, horizons, geological layers, sedimentary layers, faults, geobodies, reservoirs, etc. and stored as interpreted layers (227) in the storage repository (230). The geological layers may be differentiated by geologic age, formation type, or some other suitable differentiation of layers in the field. In one or more embodiments, layers of greater geologic age are located further away from the surface than layers of lesser geologic age. More details of the functionality of the seismic interpretation module (222) are described in reference to FIGS. 4.1-5 below.

In one or more embodiments, the dual domain analysis tool (220) is configured to perform a structural evolution analysis of a model of a field using the structural restoration module (223). The structural restoration module (223) may be configured to receive a model from the application interface (221) and restore each of the layers of the model in a batch process. Specifically, the structural restoration module (223) may receive a structural model of the field (as generated by the structural model module (270)) from the application interface (221). The structural restoration module (223) may also be configured to receive the interpreted layers (227) as a model (i.e., including the geological features identified by the seismic interpretation module (222)) and restore each layer of the model interactively. The layers restored by the structural restoration module (223) may be stored as restored layers (228) in the storage repository (230). The restored layers (228) may be geological layers, which may be differentiated by geologic age, formation type, or some other suitable differentiation of layers in the field. More details of the functionality of the structural restoration module (223) are described in reference to FIGS. 4.1-5 below.

In one or more embodiments, the dual domain analysis tool (220) is configured to provide facilities for the structural restoration module (223) to perform an interactive structural restoration while the seismic data is being interpreted using the seismic interpretation module (222). Specifically, such interactive facilities are provided by the 3D displacement mapping generator (224) and the seismic data converter (225). For example, each of the interpreted layers (227) may be incrementally generated by the seismic interpretation module (222) and included as a structural layer in an evolving model for the structural restoration module (223) to restore into each of the restored layers (228). Accordingly, the seismic data volume evolves (referred to as converted seismic data) as each of the incremental portions is interpreted and restored through incremental stages of this interactive process. In one or more embodiments, the seismic data converter (225) is configured to generate converted seismic data (231) at each of the incremental stages while the 3D displacement mapping generator (224) is configured to generate 3D displacement mappings (229) that correlate various views of the converted seismic data (231) among any of the incremental stages. More details of the functionality of the 3D displacement mapping generator (224) and the seismic data converter (225) are described in reference to FIGS. 4.1-5 below.

In one or more embodiments, the dual domain analysis tool (220) is configured to provide one or more displays (e.g., 2D display, 3D display, etc.) using the data rendering unit (226) for visualizing the data by the user during the incremental stages of structural restoration and seismic interpretation. For example, the data may include the interpreted layers (227), the restored layers (228), the converted seismic data (231), and/or combinations thereof at one or more of the incremental stages. Specifically, the data rendering unit (226) performs rendering algorithm calculations to provide the one or more displays that may be presented, using one or more communication links, to a user at the display unit (243) of the user system (240). The data rendering unit (236) may provide, either by default or as selected by a user, displays composed of any combination of one or more of the interpreted layers (227), the restored layers (228), and the converted seismic data (231). For example, one or more of the interpreted layers (227), the restored layers (228), and the converted seismic data (231) may be superimposed in one display or simultaneously presented in separate displays, which may or may not be synchronized with each other during display. In one or more embodiments, the data rendering unit (236) is provided with mechanisms for actuating various display functions in the dual domain analysis tool (220). More details of the functionality of the data rendering unit (226) are described in reference to FIGS. 4.1-5 below.

The dual domain analysis tool (220) may include one or more system computers, which may be implemented as a server or any conventional computing system. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network personal computers, mini-computers, mainframe computers, and the like.

While specific components are depicted and/or described for use in the units and/or modules of the dual domain analysis tool (220), it will be appreciated that a variety of components with various functions may be used to provide the formatting, processing, utility and coordination functions necessary to modify a magnified field model in the dual domain analysis tool (220). The components may have combined functionalities and may be implemented as software, hardware, firmware, or combinations thereof.

FIG. 3 shows an example method for interactive structural restoration while interpreting seismic volumes for structure and stratigraphy in accordance with one or more embodiments. For example, the method shown in FIG. 3 may be practiced using the system (200) described in reference to FIG. 2 above for the field (100) described in reference to FIG. 1 above. In one or more embodiments of the invention, one or more of the elements shown in FIG. 3 may be omitted, repeated, and/or performed in a different order. Accordingly, embodiments of interactive structural restoration while interpreting seismic volumes for structure and stratigraphy should not be considered limited to the specific arrangements of elements shown in FIG. 3.

Initially in Element 301, seismic data is displayed in a structural domain. Generally, the seismic data (e.g., seismic amplitude and two-way response time) represents an interaction of seismic wave propagation with geological layers in the subterranean formation. Deformations (e.g., faulting, folding, erosion, etc.) of geological layers caused by structural events may create features or patterns in the seismic data referred to as seismic events. Seismic data corresponding to a region of interest in the formation is referred to as a seismic volume. The structural domain may represent the region of interest in a time scale or a depth scale, where each scale is convertible to the other based on a velocity model of seismic wave propagation. In one or more embodiments, the seismic data may be sampled or interpolated for display according to a grid of the structural domain.

In Element 302, a seismic interpretation is performed for deciphering features in the displayed seismic data to identify a first portion of the seismic data as relating to a first geological layer. Accordingly, the first portion of the seismic data is designated as a first interpreted layer. In one or more embodiments, the first portion of the seismic data may be annotated in the display for ease of visualizing the remaining portions of the seismic volume. In one or more embodiments, the first interpreted layer may be included in a structural model of the formation, which in turn is restored by structural restoration. More details of interpreting seismic data to identify the first interpreted layer while interactively performing structural restoration are described in reference to FIGS. 4.1-5 below.

In Element 303, a first structural restoration is performed to remove effects of the deformations on the first interpreted layer. In one or more embodiments, the first structural restoration is performed by (1) determining a first layer mapping based on an effect of the deformations on the first interpreted layer, (2) generating a first restored layer by applying the first layer mapping to the first interpreted layer for removing the effect of the deformations on the first interpreted layer, (3) determining a first de-compaction mapping based on a compaction effect of the first geological layer on a first remaining portion of the seismic data corresponding to geological layers beneath the first geological layer in the plurality of geological layers, and (4) generating first de-compacted seismic data by applying the first de-compaction mapping to the first remaining portion of the seismic data for removing the compaction effect caused by the first geological layer. In one or more embodiments, the first interpreted layer may be unfaulted and unfolded using structural restoration techniques known to those skilled in the art. As noted above, the deformations of a geological layer may be caused by erosion in addition to faulting and folding. Specifically, due to geologic episodes of erosion or non-deposition of sediment (hiatus), the first interpreted layer may have missing surface section(s) that do not exist in the structural domain but their existence at a structurally restored geologic age can be inferred. In one or more embodiments, such missing surface section(s) are recovered by inference and added back into the first interpreted layer in the structurally restored domain during structural restoration. In such embodiments, the first layer mapping is determined further based on the erosion in addition to the faulting and folding effects. In this case, the first layer mapping may include an unfaulting mapping, unfolding mapping, as well as an erosion restoration mapping, which removes the faulting effect and the folding effect on the first interpreted layer as well as restore the missing eroded surface(s) back to the first interpreted layer.

While traditional structural restoration techniques are typically applied to a structural model containing interpreted layer, the un-interpreted portion of the seismic volume outside of the first interpreted layer may be de-compacted using essentially the same de-compaction techniques employed by traditional structural restoration methods. In particular, interpreted as well as not-yet interpreted seismic data may be re-sampled and interpolated during the restoration and de-compaction. In one or more embodiments, the first interpreted layer is restored using an un-geologically realizable mapping to reduce computational complexity such that interactive structural restoration of the first interpreted layer may be advantageously performed concurrently while seismic data is being interpreted. Specifically, the interpreted as well as not-yet interpreted seismic data may be displaced (e.g., by parallel shifting) and not re-sampled and interpolated during the restoration and de-compaction. More details of structural restoration of the first interpreted layer using the un-geologically realizable mapping are described in reference to FIGS. 4.1-5 below.

In Element 304, a first structurally restored domain is generated by applying the first layer mapping and the first de-compaction mapping to the structural domain. In one or more embodiments, the mapping may relocate seismic data sampling positions in the structural domain in a parallel shift without interpolation of the seismic data into the first structurally restored domain. More details of generating the first structurally restored domain are described in reference to FIGS. 4.1-5 below.

In Element 305, first converted seismic data is generated. In one or more embodiments, the first de-compacted seismic data is designated as the first converted seismic data and is displayed in the first structurally restored domain. In particular, the display represents the subterranean formation prior to a first geologic time at the time of deposition of the first geological layer. In one or more embodiments, the first restored layer is also included in the first converted seismic data and is displayed in the first structurally restored domain along with the first de-compacted seismic data. In such embodiments, the display represents the subterranean formation at the first geologic time prior to geologic events that may have faulted and folded the first geological layer. The view allows the user to re-adjust interpretation and restoration of the first geological layer incrementally and iteratively while interpreting deeper layers within the first de-compacted seismic data. Accordingly, confidence in deeper layer interpretation is improved based on the clearer view of the features depicted in the first restored geological layer. For example, sedimentary layers that were unable to be deciphered in the structural domain may not be interpreted using the first converted seismic data displayed in the first structurally restored domain. Example screenshots of such embodiments are depicted in FIG. 4.3 below. More details of displaying the first converted seismic data are described in reference to FIGS. 4.1-5 below.

In Element 306, additional seismic interpretation is performed to identify a portion of the displayed first converted seismic data as relating to a second geological layer. Accordingly, this portion of the first converted seismic data is designated as a second interpreted layer. In one or more embodiments, the portion of the first converted seismic data may be annotated in the display for ease of visualizing the remaining portions of the seismic volume. In one or more embodiments, the second interpreted layer may be included in a structural model of the formation, which in turn is restored by structural restoration. More details of interpreting seismic data to identify the second interpreted layer while interactively performing structural restoration are described in reference to FIGS. 4.1-5 below.

In Element 307, a second structural restoration is performed to remove effects of the deformations on the second interpreted layer. In one or more embodiments, the second structural restoration is performed in the first structurally restored domain in a similar manner as the first structural restoration performed in the structural domain. For example, the second structural restoration may be performed using the aforementioned un-geologically realizable mapping to reduce computational complexity such that interactive structural restoration of the second interpreted layer may be advantageously performed while seismic data is being interpreted concurrently. More details of structural restoration of the second interpreted layer using the un-geologically realizable mapping are described in reference to FIGS. 4.1-5 below.

In Element 308, a second structurally restored domain is generated by applying a second layer mapping and a second de-compaction mapping to the first structurally restored domain. For example, the second layer mapping and second de-compaction mapping may be determined in the first structurally restored domain in a similar manner as how the first layer mapping and first de-compaction mapping determined are determined in the structural domain with the exception that the first restored layer remains un-mapped. In particular, the mappings may relocate seismic data sampling positions in the first structurally restored domain (excluding the first restored layer) in a parallel shift without interpolation of the seismic data into the second structurally restored domain. More details of generating the second structurally restored domain are described in reference to FIGS. 4.1-5 below.

In Element 309, second converted seismic data is generated. In one or more embodiments, the second restored layer and the second de-compacted seismic data are combined as second converted seismic data and are displayed in the second structurally restored domain. In particular, the display represents the subterranean formation at a second geologic time at the time of deposition of the second geological layer prior to geologic events that may have faulted and folded the second geological layer as well as the deposition of the first geological layer. In one or more embodiments, the first restored layer is also included in the second converted seismic data and is displayed in the second structurally restored domain along with the second restored layer and the second de-compacted seismic data. In such embodiments, the display represents a composite of the subterranean formation at the second geologic time superimposed with restored structural history subsequent to the second geologic time. In such embodiments, the display is a composite of the subterranean formation at the first geologic time superimposed with restored structural history subsequent to the first geologic time. The composite view allows the user to re-adjust interpretation and restoration of the first and second geological layers incrementally and iteratively while interpreting deeper layers within the second de-compacted seismic data. For example, sedimentary layers that were unable to be deciphered in the structural domain may not be interpreted using the second converted seismic data displayed in the second structurally restored domain. Further, sliding alignment of disjoint surfaces (e.g., broken by faults) in interpretation and/or restoration of the first and second geological layers may be adjusted based on this composite display to facilitate interpretations of features in the second de-compacted seismic data displayed in the second structurally restored domain. Accordingly, confidence in deeper layer interpretation is improved based on the clearer view of the features depicted in the first and second restored geological layer. Example screenshots of such embodiments are depicted in FIG. 4.3 below. More details of displaying the second converted seismic data are described in reference to FIGS. 4.1-5 below.

In one or more embodiments, incremental seismic interpretation may be performed to identify additional features of the subterranean formation, such as a fault, a horizon, a stratigraphic deposition layer, etc. that may interest or exist in-between the first and/or second geological layers. Such incremental interpretations may be performed in any of the domains described above or performed by cross referencing corresponding features in each of the displayed domains, including the structural domain, the first structurally restored domain, and the second structurally restored domain. More details of such incremental interpretation are described in reference to FIGS. 4.1-5 below.

In one or more embodiments, the aforementioned un-geologically realizable mapping is performed by (1) identifying a top reference surface in the first structurally restored domain for generating the first restored layer, (2) extending spaced sampling traces between a top surface and a bottom surface of the first interpreted layer to traverse the first portion of the seismic data in the structural domain, and (3) relocating, without interpolation, the first portion of the seismic data traversed by each of the plurality of spaced sampling traces according to parallel shifting of the spaced sampling traces from the top surface in the structural domain to the top reference surface in the first structurally restored domain. Specifically, the first layer mapping is determined by identifying mapped sampling positions on the top reference surface in the first structurally restored domain corresponding to at least a portion of seismic data sampling positions on the top surface in the structural domain. Further, the spaced sampling traces are extended starting from the seismic data sampling positions on the top surface and ending at the seismic data sampling positions on the bottom surface in the structural domain. Accordingly, at least a portion of the plurality of spaced sampling traces are parallel shifted from the seismic data sampling positions on the top surface to the mapped sampling positions on the top reference surface.

In one or more embodiments, the aforementioned un-geologically realizable mapping is applied to layers intersected by a fault with additional elements of (1) identifying a fault line portion of the top surface and a fault line portion of the bottom surface and (2) concatenating seismic data traversed by a first spaced sampling trace starting from a first sampling position on a fault line portion of the top surface and seismic data traversed by a second spaced sampling trace ending on a second sampling position on a fault line portion of the bottom surface based on joining the first and the second sampling positions.

In one or more embodiments, the aforementioned un-geologically realizable mapping is applied to layers intersected by a fault with further additional elements of (1) identifying a bottom reference surface in the first structurally restored domain for generating the first restored layer, (2) determining, as a result of the parallel shifting, a relocated bottom surface in the first structurally restored domain corresponding to the bottom surface in the structural domain, and (3) further relocating the first portion of the seismic data traversed by each of the plurality of spaced sampling traces based on a proportional conversion along a direction of the spaced sampling traces to align the relocated bottom surface to the bottom reference surface.

In the description of the un-geologically realizable mapping above, the layer may be bounded by seismic horizon surfaces. Preferably the sampling traces extend substantially perpendicularly to the horizon surfaces. However, when for example some of the horizon surfaces are inclined relative to other horizon surfaces, then that inclination may be reflected in a non-perpendicular intersection between the inclined horizon surfaces and the sampling traces. Typically the sampling traces are substantially parallel to each other. More details of the un-geologically realizable mapping are described in reference to FIGS. 4.1-5 below.

FIGS. 4.1, 4.2, and 4.3 each show an example display screenshot for interactive structural restoration while interpreting seismic volumes for structure and stratigraphy in accordance with one or more embodiments. In one or more embodiments, the example display screenshots may be in a time scale or a depth scale, which are convertible to each other based on a velocity model.

FIG. 4.1 depicts a screenshot (410) of an example structural domain described in reference to FIGS. 2 and 3 above. As shown, a three-dimensional (3D) structural model of a field (e.g., filed (100) depicted in FIG. 1 above) is shown in the structural domain including a number of geological layers. In one or more embodiments, the 3D structural model of the field is a paleo-spastic model, which depicts a geological object at the time of deposition. For example, the structural model has already been validated using the system and method described in reference to FIGS. 2 and 3 above. In particular, the structural model may have been created and validated using field data collected from any number of sources described in reference to FIG. 1 above, as well as using the system and method described in reference to FIGS. 2 and 3 above and, optionally, in combination with any of a number of software programs or other subterranean formation model technologies known in the art. The structural model in FIG. 4.1 shows three geological layers (i.e., geological layer A (424), geological layer B (426), geological layer C (428)) of the field under the surface (430). Geological layer A (424), geological layer B (426), and geological layer C (428) may be consecutive geological layers in the subterranean formation. In addition, other geological layers, not shown in FIG. 4.1, may exist between geological layer A (424), geological layer B (426), and/or geological layer C (428).

As can be seen, geological layer A (424), geological layer B (426), and geological layer C (428) contain undulations designating relative elevation within each part of the geological layers. Generally, such undulations represent faulting and/or folding effects of geological events, which may be combined with compaction effect due to gravity. In one or more embodiments, the extent of various undulations in geological layers are depicted by color coding, hatching, or some other way of designating relative elevation within each part of geological layers. In this example in FIG. 4.1, the undulations within geological layer A (424), geological layer B (426), and geological layer C (428) are shown by hatching.

Geological layer A (424) is the oldest shown geological layer in the field because geological layer A (424) is the furthest geological layer from the surface (430). Geological layer B (426) is the second oldest shown geological layer in the field because geological layer B (426) is the second furthest geological layer from the surface (430). Geological layer C (428) is the youngest shown geological layer in the field because geological layer C (428) is the closest geological layer to the surface (430). When restoring the geological layers from the structural model, the newest geological layer (i.e., geological layer C (428)) may be restored initially, followed by the next youngest geological layer (i.e., geological layer B (426)) and so on.

FIG. 4.2 depicts a screenshot (420) of an example structurally restored domain described in reference to FIGS. 2 and 3 above. As shown, geological layer A (440), which is a reconstruction (i.e., structurally restored version) of geological layer A (424) in FIG. 4.1 and the oldest geological layer in the subterranean formation is shown in the structurally restored domain. As can be seen, geological layer A (440) contains significantly fewer undulations compared to geological layer A (424) in FIG. 4.1 because the faulting and folding effects of the geological events and compaction effects of the geological layer B (426) and geological layer C (428) are largely removed by the restoration process. In this example in FIG. 4.2, the undulations within geological layer A (440) are shown by hatching.

In one or more embodiments, while each of the geological layers of the subterranean formation in the field (e.g., geological layer A (424), geological layer B (426), geological layer C (428) from FIG. 4.1) is being restored, a seismic interpretation of remaining geological layers and other features (i.e., seismic reflection patterns) in the seismic images may be interpreted concurrently and interactively by simultaneous viewing of the structural domain and structurally restored domain depicted in FIGS. 4.1 and 4.2, respectively. In one or more embodiments, the youngest geological layer is the first to be interpreted and restored, followed by the next youngest, and so on. Example screenshots depicting the interactive restoration of geological layer A (424) while interpreting structures and stratigraphy are shown in FIG. 4.3 below.

FIG. 4.3 depicts a screenshot (430) of an example structural domain and a screenshot (431) of an example structurally restored domain, as described in reference to FIGS. 2 and 3 above. In the screenshots (430) and (431), 3D data volumes collected in a field (e.g., filed (100) depicted in FIG. 1 above) are rotated to show cross-sectional views of seismic amplitudes with highlighted features. In one or more embodiments, the seismic amplitudes are depicted by color coding, hatching, or some other way of designating seismic amplitudes. In this example in FIG. 4.3, the seismic amplitudes within the screenshots (430) and (431) are shown by hatching. For clarity, solid lines are used to highlight seismic features that are already interpreted and/or validated while dash lines are used to highlight seismic features not yet interpreted and/or validated.

As shown in the screenshot (430), solid line segments (401-1, 401-2, 401-3) and solid line segments (402-1, 402-2, 402-3) represent interpreted and/or validated seismic features. Depending on the relative scales, the solid line segments may correspond to geological layer C (428) and geological layer B (426), respectively, or correspond to a top surface and bottom surface of geological layer B (426) as depicted in FIG. 4.1 above. In addition, dash line segments (403-1, 403-2, 403-3), dash line segments (404-1, 404-2, 404-3), and dash line segments (407-1, 407-2, 407-3) represent seismic features not yet interpreted and/or validated, from which geological layer A (424) and other structure and stratigraphy are being interpreted and/or validated during the interactive structural restoration while interpreting seismic volumes. Further as shown in screenshot (430), line segment (405) and line segment (406) each include solid and dashed portions representing faults created by geological events where solid portions have been interpreted and/or validated and dash portions have not yet been interpreted and/or validated.

As shown in the screenshot (431), solid line segments (411-1, 411-2, 411-3) and solid line segments (412-1, 412-2, 412-3), which are reconstructions (i.e., structurally restored version) of solid line segments (401-1, 401-2, 401-3) and solid line segments (402-1, 402-2, 402-3), respectively, corresponding to at least one of the two youngest geological layers B (426) and C (428) in the subterranean formation, are shown in the structurally restored domain. As can be seen, solid line segments (411-1, 411-2, 411-3) and solid line segments (412-1, 412-2, 412-3) contain significantly fewer undulations as compared to solid line segments (401-1, 401-2, 401-3) and solid line segments (402-1, 402-2, 402-3) in screenshot (430) because the faulting and folding effects of the geological events and gravity induced compaction effects are largely removed by the restoration process.

Further as shown in screenshot (431), dash line segments (413-1, 413-2, 413-3), dash line segments (414-1, 414-2, 414-3), and dash line segments (417-1, 417-2, 407-3), which are de-compacted version of dash line segments (403-1, 403-2, 403-3), dash line segments (404-1, 404-2, 404-3), and dash line segments (407-1, 407-2, 407-3) where gravity induced compaction effects from at least one of the geological layer C (428) and geological layer B (426) are removed during the structural restorations thereof. Although the faulting and folding effects of the geological events on dash line segments (413-1, 413-2, 413-3), dash line segments (414-1, 414-2, 414-3), and dash line segments (417-1, 417-2, 407-3) are not yet removed prior to the structural restoration of geological layer A (424) and other structure and stratigraphy, these dash line segments contain relatively less undulations compared to the corresponding dash line segments in screenshot (430), and, thus, provide improved interpretation confidence. In one or more embodiments, the screenshots (430) and (431) are viewed simultaneously during interactive structural restoration while interpreting seismic structure and stratigraphy. In one or more embodiments, all or a portion of the screenshots (410), (420), (430), and (431) are viewed interchangeably and simultaneously during interactive structural restoration while interpreting seismic structure and stratigraphy. In one or more embodiments, the screenshot (410) is superimposed with the screenshot (430) in the structural domain, and/or the screenshot (420) is superimposed with the screenshot (431) in the structurally restored domain, where the two domains are viewed simultaneously during interactive structural restoration while interpreting seismic structure and stratigraphy.

As will be described in reference to FIG. 5 below, the dashed line segments turn into solid line segments in the screenshot (430) upon being interpreted in each of the seismic interpretation steps depicted in FIG. 5. Accordingly, at the end of the workflow depicted in FIG. 5, the entire screenshot (430) includes all solid line segments representing fully interpreted seismic volume corresponding to present day subterranean formation. Correspondingly, the dashed line segments turn into solid line segments in the screenshot (431) upon being restored in each of the structural restoration steps depicted in FIG. 5. Accordingly, at the end of the workflow depicted in FIG. 5, the entire screenshot (431) includes all solid line segments representing fully interpreted and restored seismic volume corresponding to present day subterranean formation.

While the description so far may involve traditional structural restoration methods known to those skilled in the art, in one or more embodiments "non-geologically realizable" methods described in reference to FIGS. 4.4 and 4.5 below may be used to facilitate the correlation across fault blocks during interpretation of the correct structural relationship across fault blocks.

FIGS. 4.4 and 4.5 show example geological layer mappings for interactive structural restoration while interpreting seismic volumes for structure and stratigraphy in accordance with one or more embodiments.

Generally, the example mapping shown in FIG. 4.4 transforms an isochronous seismic event (that has been faulted and folded) into a flat and reconstructed seismic reflector by using isochors preserving the distances along the reconstructed seismic reflector with no lateral stretch and squeeze and, thus, without interpolation. Intuitively, one can imagine the top of the layer being a rope with "pendulums" hanging at a regular spacing along the top, where the pendulums represent spaced sampling traces traversing the seismic volume. When the rope is unfolded, the pendulums stay vertical at the same distance between each other, thus, keeping the isochors constants.

Specifically, FIG. 4.4 shows a schematic representation of a portion (453) of the seismic volume depicted above in screenshot (430) of FIG. 4.3 corresponding to an interpreted geological layer (e.g., geological layer B (426) depicted in the screenshot (410) of FIG. 4.1 above). In particular, the top surface and the bottom surface identified according to the legend (620) correspond to the solid line segments (401-1, 401-2, 401-3) and the solid line segments (402-1, 402-2, 402-3) depicted in the screenshot (430) of FIG. 4.3 above, respectively. Further according to the legend (620), seismic sampling positions (e.g., sampling positions (604-1), (605-1), (606-1), (607-1), (608-1), (609-1)) are depicted as equally spaced sampling traces (e.g., sampling traces (612), (614)) traversing the interpreted geological layer between the top and bottom surfaces. Accordingly, each sampling positions along a spaced sampling trace is associated with a corresponding seismic amplitude.

Further as shown in FIG. 4.4, a top reference surface (610) traverses mapped sampling positions (604-2), (605-2), (606-2), (607-2), (608-2), (609-2) and corresponds to solid line segments (411-1, 411-2, 411-3) depicted in the screenshot (431) of FIG. 4.3 above. As can be seen based on the lines connecting sampling positions on the top surface (630) to corresponding mapped sampling positions on the top reference surface (610), each of the spaced sampling traces with seismic amplitudes between the top surface (630) and bottom surface (640) are relocated by parallel shifting as "vertically hanging pendulums" to "hang" from corresponding mapped sampling positions on the top reference surface (610). For example, the sampling positions (604-1), (605-1), (606-1), (607-1), (608-1), (609-1) on the top surface of the interpreted layer are relocated to the mapped sampling positions (604-2), (605-2), (606-2), (607-2), (608-2), (609-2), respectively, on the top reference surface. The relocated spaced sampling traces with corresponding seismic amplitudes are referred to as the converted seismic data, which is omitted in FIG. 4.4 for clarity. The bottom surface of the volume containing the converted seismic data is generally not flattened during the geometric parallel shifting process.

In addition, the fault line portions (615) and (616) of the top surface correspond to the solid line portions of the fault (405) and (406) of the screenshot (430) of FIG. 4.3 above, which are treated separately from other non-fault line portions of the top surface. For example, the sampling trace (612) "hanging" from the fault line portion (615) of the top surface is concatenated with the sampling trace (614) "hanging" from the sampling position (606-1) on the non-fault line portion of the top surface. In this example concatenation, the top sampling position of the sampling trace (612) is joined with the bottom sampling position of the sampling trace (614) while the concatenated sampling trace with corresponding seismic amplitude is parallel-shifted to the mapped sampling position (606-2) on the top reference surface.

Accordingly, the layer mapping scheme is purely geometric and very convenient as it simplifies the unfolding problem, with the tradeoff of not taking into account the strain/stress that was applied on the features (e.g., sedimentary layers) within the interpreted geological layer, and also neglecting the true stratigraphic thickness of such features. Nevertheless, the geometric layer mapping in not intended to restore the depositional geometries, but to convert the seismic volume into an artificial domain where the structural effect of the tectonics has been removed in order to allow a focused interpretation process.

The steps explained above relate to the restoration based on unfolding the top layer. FIG. 4.5 shows a geological layer mapping that flattens the bottom layer by linear/vertical compaction/de-compaction (i.e., squeeze/stretch) of a portion (601) of the converted seismic volume (not shown) described above. Specifically, surface (651) of FIG. 4.5 corresponds to the top reference surface of FIG. 4.4 and the solid line segments (411-1, 411-2, 411-3) depicted in the screenshot (431) of FIG. 4.3 above. Further, surface (652-1, 652-2) corresponds to the bottom surface of the converted seismic data, and surface (653) is a bottom reference surface and corresponds to the solid line segments (412-1, 412-2, 412-3) depicted in the screenshot (431) of FIG. 4.3 above. Additional features (657) may be identified during interpretation.

As shown in FIG. 4.5, the right side of converted seismic volume portion (601) below the fault line (406) is shown to include equal-thickness layer features and is stretched in the directions denoted according to the legend (660) by using a proportional stretch factor determined in such a way to relocate the bottom surface (652-1) to the bottom reference surface (653) while leave the top surface (651) in the same location. In particular, the proportional stretch factor is constant for sampling positions along a horizontal line and is variable for sampling positions along the horizontal line.

Further as shown in FIG. 4.5, the left side of converted seismic volume portion (601) above the fault line (406) is shown to include graduating thickness layer features and is stretched in the directions denoted according to the legend (660) by using a proportional stretch factor determined in such a way to relocate the bottom surface (652-2) to the bottom reference surface (653) while leave the top surface (651) in the same location. In particular, the proportional stretch factor is variable for sampling positions along either a horizontal line or a vertical line. For example, the stretch amount denoted according to the legend (660) may vary with respect to either a horizontal position or a vertical position according to a linear relationship represented by the wedge (656).

Aspects of this 3D sampling interpolation strategy allows seismic amplitude repositioning at the seismic trace level (or a portion thereof) from a structural domain to a structurally restored domain without repositioning computations for each individual sample position. An example algorithm may be performed by (1) identifying the first sample of the trace (on the top surface); (2) positioning the first sample at the structurally restored domain top reference surface; and (3) relocating the other samples of the trace using a gravity algorithm. Thus for one geological layer between the top and bottom surface depicted in FIG. 4.4, there are only 2 parameters stored per seismic trace, namely "i parameter" (603) and "h parameter" (602) shown in the enlarged version of the portion (600) of the seismic volume. The low computational complexity of the example algorithm allows for rapid mapping between the various geo-time domains and the structural domain.

Figure 5:
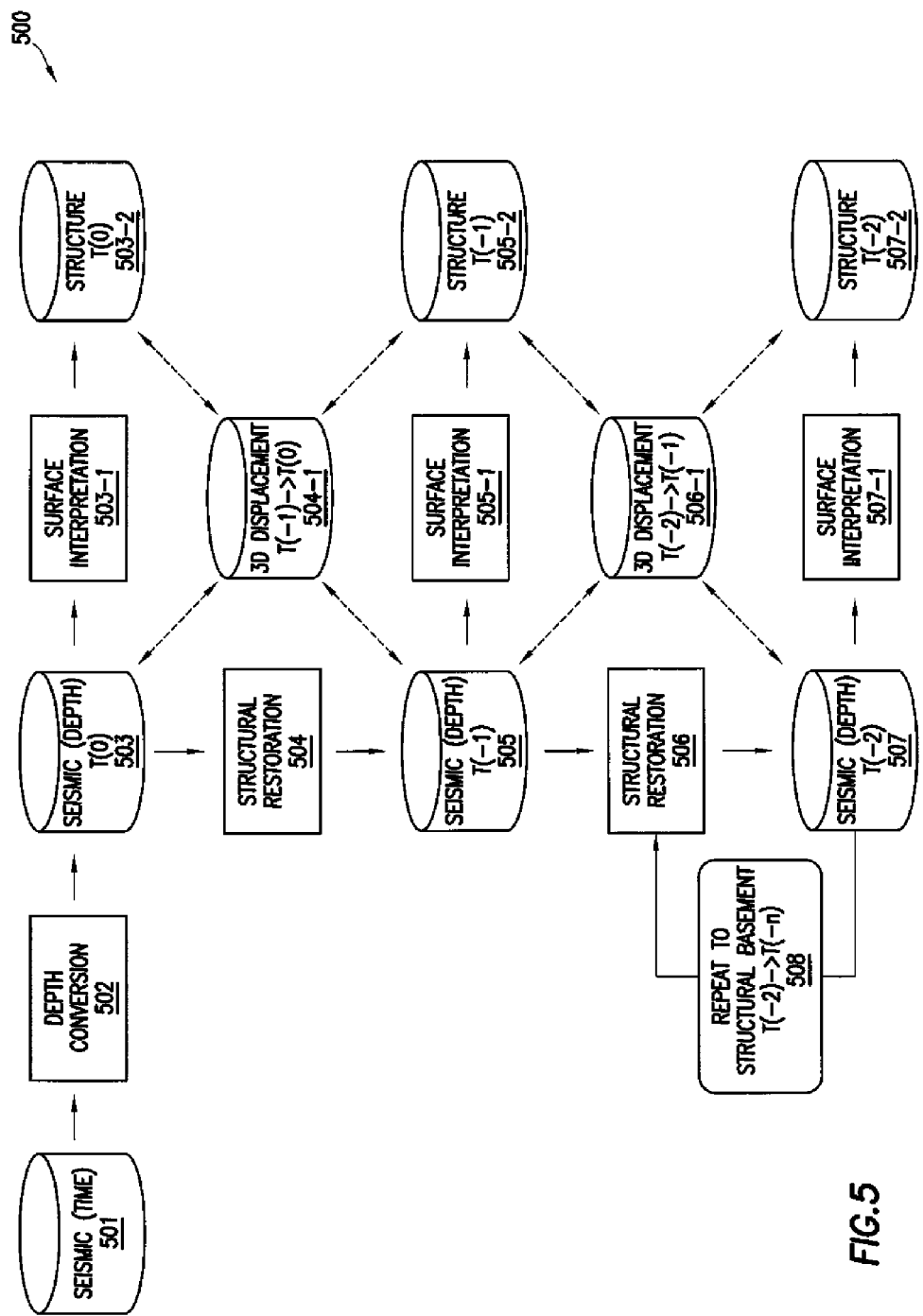
FIG. 5 shows an example workflow for interactive structural restoration while interpreting seismic volumes for structure and stratigraphy in accordance with one or more embodiments.

FIG. 5 shows an example workflow (500) for interactive structural restoration while interpreting seismic volumes for structure and stratigraphy in accordance with one or more embodiments. In one or more embodiments, the workflow (500) is based on the system and method described in reference to FIGS. 2 and 3 above and is applicable to the field (100) depicted in FIG. 1 above. In one or more embodiments, the workflow (500) begins with time domain seismic data (501) converted (based on a velocity model to perform a depth conversion (502)) to depth domain seismic data (503). The time domain seismic data (501) and depth domain seismic data (503) are displayed in the original structural domain corresponding to present day geologic time T(0). The user (not shown) may interpret the earliest significant structural features (shallow horizons and shallow extending faults or intrusions referred to as "events" within the seismic volume) based on seismic reflection patterns (e.g., solid line segments (401-1, 401-2, 401-3) depicted in screenshot (430) of FIG. 4.3 above) in the structural domain (displaying seismic data (503)) during a surface interpretation (503-1) to identify structure and stratigraphy (e.g., geological layer C (428) depicted in FIG. 4.1 above) for storing in a structure model (503-2). Structural restoration (504) is then performed and applied to the seismic volume (i.e., seismic data (503)) to restore the volume in such a way that the structural surfaces (e.g., solid line segments (401-1, 401-2, 401-3)) are returned to their pre-structurally deformed geometry (e.g., solid line segments (411-1, 411-2, 411-3) depicted in screenshots (431) of FIG. 4 above) at geologic time T(−1). The result of the structural restoration (504) is stored as first converted seismic data (505) and displayed in a first structurally restored domain (e.g., screenshot (431)). In particular, the first converted seismic data (505) includes restored structural surfaces (e.g., of the geological layer C (428) depicted in FIG. 4.1 above) as well as not yet interpreted seismic data of deeper portions of the seismic volume beneath the restored structural surfaces. The workflow allows the user to view the volume (e.g., seismic data (503), seismic data (505)) and any interpretation (e.g., solid line segments (401-1, 401-2, 401-3), geological layer C (428)) in both the structurally restored domain (e.g., screenshot (431), screenshot (420)) corresponding to geologic time T(−1) and the original structural domain (e.g., screenshot (430), screenshot (410)) corresponding to geologic time T(0). The structural restoration (504) also produces a 3D displacement mapping (504-1) between the two domains that maps the positions (e.g., sampling positions) of the volume at T(−1) to the volume at T(0).

Additional interpretation (505-1) can now be performed in either view displayed in either domain (e.g., dash line segments (403-1, 403-2, 403-3), dash line segments (404-1, 404-2, 404-3), and dash line segments (407-1, 407-2, 407-3) displayed in the structural domain (503) or dash line segments (413-1, 413-2, 413-3), dash line segments (414-1, 414-2, 414-3), and dash line segments (417-1, 417-2, 407-3) displayed in the first structurally restored domain (505)) while the mapping (504-1) allows viewing of this interpretation activity in each view with correlations according to corresponding geometric positions. In particular, the interpretation of stratigraphy for the geologic layer can now be performed with higher confidence without the interference of structural complexity in the first structurally restored domain (505). For example, the sedimentary layer structures may be identified during the interpretation (505-1) to be stored in the updated structural model (505-2). In addition, the interpretation (505-1) further deciphers the structural events that created the next older geological layer (paleo-structure) (e.g., geological layer A (424)) that is also stored in the updated structural model (505-2). This geological layer is then restored during structural restoration (506) and a third volume (i.e., seismic data (507)) is created corresponding to geologic time T(−2). A mapping (506-1) is created from the previous first structurally restored view T(−1) and this second structurally restored view T(−2).

The process of interactive structural restoration while interpreting seismic data described above can be repeated in an iteration loop (508) until the structural history of the entire seismic volume has been restored, and the paleo-structure can be extracted for any geologic event (age) and the interpretation between each volume (503, 505, 507, etc.) is linked through the 3D displacement mappings (504-1, 506-1). The various structurally restored domains (e.g., the first structurally restored domain displaying the first converted seismic data (505), the second structurally restored domain displaying the second converted seismic data (507)) are referred to as geo-time domains (i.e., each corresponding to a geologic time, such as T (−1), T(−2), etc.) and may be viewed simultaneously in which further interpretation (e.g., detailed stratigraphic analysis) or editing may be performed by mapping the active view to any geologic age. For example, the interpretation (503-1), the structural restoration (504), the interpretation (505-1), the structural restoration (506), the interpretation (507-1), etc. may be incrementally adjusted in any of the aforementioned domains with the adjustment propagated to other domains via the aforementioned 3D displacement mappings without restarting from the original seismic data (503) displayed in the original structural domain. In one or more embodiments, the geotime domains may be viewed using a structural process player that allows the user to step forward or backwards the geologic age to view, edit, or interpret seismic data displayed in the structurally restored domain at any stage of the restoring while interpreting process depicted in the workflow (500).

Corresponding to the iteration loop (508) depicted in FIG. 5, the dashed line segments turn into solid line segments in the screenshot (430) of FIG. 4.3 above upon being interpreted in each of the seismic interpretation steps depicted in FIG. 5. Accordingly, at the end of the work flow depicted in FIG. 5, the entire screenshot (430) includes all solid line segments representing fully interpreted seismic volume corresponding to present day subterranean formation. Correspondingly, the dashed line segments turn into solid line segments in the screenshot (431) of FIG. 4.3 above upon being restored in each of the structural restoration steps depicted in FIG. 5. Accordingly, at the end of the work flow depicted in FIG. 5, the entire screenshot (431) includes all solid line segments representing fully interpreted and restored seismic volume corresponding to present day subterranean formation.

Utilizing the workflow (500) described above, the user is provided with the capability of computing attributes of the converted seismic data in the geo-time domain, and then transforming the computed attributes back to the structural domain. Accordingly, the structural effect of the folding and faulting is removed at a large scale and, thus, the energy of the seismic reflector is continuously and horizontally (for isochronous events) distributed across the seismic volume. In this manner, amplitude smearing caused by attributes affecting the lateral distribution of the amplitude energy may be eliminated.

In the foregoing description, the geological layers may be bounded by horizon surfaces. Typically, although not necessarily, the horizon surfaces are spatially continuous. Further, the horizon surfaces may correspond to interfaces between strata, although the horizon surfaces may also be used to represent boundaries of geobodies, such as hydrocarbon reservoirs or salt bodies. Although the examples described above refers to geological layers, those skilled in the art with the benefit of this disclosure will appreciate that the method may be used to perform interactive and concurrent structural restoration and seismic interpretation of tectonic and stratigraphic features such as horizon surfaces, geobodies or faults.

Figure 6:
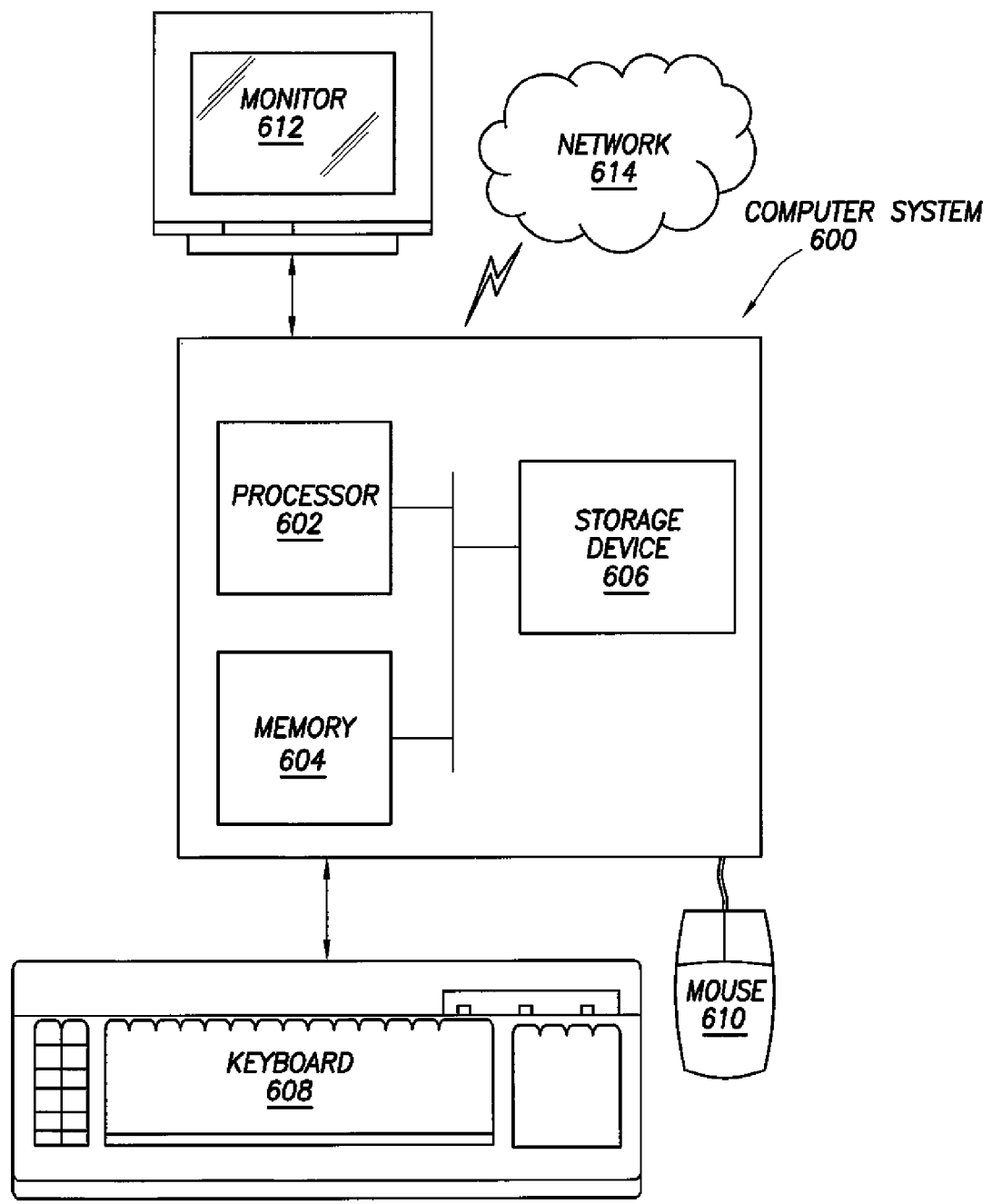
FIG. 6 shows a computer system in which one or more embodiments of interactive structural restoration while interpreting seismic volumes for structure and stratigraphy may be implemented.

Embodiments of interactive structural restoration while interpreting seismic volumes for structure and stratigraphy may be implemented on virtually any type of computer regardless of the platform being used. For instance, as shown in FIG. 6, a computer system (600) includes one or more processor(s) (602) such as a central processing unit (CPU) or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display LCD, a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, or any other computing system capable of executing computer readable instructions), and the aforementioned input and output means may take other forms, now known or later developed. Generally, the computer system (600) includes at least the minimal processing, input, and/or output means necessary to practice one or more embodiments.

Further, those skilled in the art will appreciate that one or more elements of the aforementioned computer system (600) may be located at a remote location and connected to the other elements over a network. Further, one or more embodiments may be implemented on a distributed system having a plurality of nodes, where each portion of the implementation (e.g., various components of the dual domain analysis tool) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a non-transitory computer readable storage medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While embodiments of the invention have been described with respect to a limited number of embodiments, those skilled in the art, having benefit of this disclosure, will appreciate that other embodiments may be devised which do not depart from the scope of the invention as disclosed herein. Accordingly, the scope of embodiments of the invention should be limited only by the attached claims.

What is claimed is:

1. A method for performing seismic interpretation of a subterranean formation, comprising:
    displaying seismic data in a structural domain representing an interaction of seismic wave propagation with a plurality of geological layers in the subterranean formation, wherein the plurality of geological layers comprises deformations caused by a plurality of structural events;
    performing, in response to displaying the seismic data, a seismic interpretation to identify a first portion of the seismic data relating to a first geological layer of the plurality of geological layers, wherein the first portion of the seismic data is designated as a first interpreted layer;
    performing, by a processor of a computer system, a first structural restoration by:
        determining a first layer mapping based on an effect of the deformations on the first interpreted layer;
        generating a first restored layer by applying the first layer mapping to the first interpreted layer for removing the effect of the deformations on the first interpreted layer;
        determining a first de-compaction mapping based on a compaction effect of the first geological layer on a first remaining portion of the seismic data corresponding to geological layers beneath the first geological layer in the plurality of geological layers; and
        generating first de-compacted seismic data by applying the first de-compaction mapping to the first remaining portion of the seismic data for removing the compaction effect of the first geological layer;
    generating a first structurally restored domain by applying the first layer mapping and the first de-compaction mapping to the structural domain; and
    displaying first converted seismic data in the first structurally restored domain representing the subterranean formation at a first geologic time corresponding to a time of deposition of the first geological layer, wherein the first converted seismic data comprises the first restored layer and the first de-compacted seismic data.

2. The method of claim 1,
wherein the effect of the deformations comprises at least one selected from a group consisting of a faulting effect and a folding effect, and
wherein applying the first layer mapping to the first interpreted layer comprises at least one selected from a group consisting of interpolating the first portion of the seismic data and displacing a plurality of sampling positions thereof based on the first layer mapping, and
wherein applying the first de-compaction mapping to the first remaining portion of the seismic data comprises at least one selected from a group consisting of interpolating the first remaining portion of the seismic data and displacing a plurality of sampling positions thereof based on the first de-compaction mapping.

3. The method of claim 1, further comprising:
performing, in response to displaying the first converted seismic data, the seismic interpretation to identify a portion of the first converted seismic data relating to a second geological layer of the plurality of geological layers, wherein the portion of the first converted seismic data is designated as a second interpreted layer;
performing a second structural restoration by:
  determining a second layer mapping based on an effect of the deformations on the second interpreted layer;
  generating a second restored layer by applying the second layer mapping to the second interpreted layer for removing the effect of the deformations on the second interpreted layer;
  determining a second de-compaction mapping based on a compaction effect of the second geological layer on a remaining portion of the first converted seismic data corresponding to geological layers beneath the second geological layer in the plurality of geological layers; and
  generating a second de-compacted seismic data by applying the second de-compaction mapping to the remaining portion of the first converted seismic data for removing the compaction effect of the second geological layer;
generating a second structurally restored domain by applying the second layer mapping and the second de-compaction mapping to the first structurally restored domain; and
displaying second converted seismic data in the second structurally restored domain representing at least the subterranean formation at a second geologic time corresponding to a time of deposition of the second geological layer, wherein the second converted seismic data comprises the first restored layer, the second restored layer and the second de-compacted seismic data.

4. The method of claim 3, wherein the second converted seismic data further comprises the first restored layer, the method further comprising:
performing, in response to displaying the second converted seismic data, at least one selected from a group consisting of an adjustment of previous seismic interpretation and additional seismic interpretation,
wherein adjustment of previous seismic interpretation comprises adjustment of at least one selected from a group consisting of the first interpreted layer and the second interpreted layer,
wherein the additional seismic interpretation identifies of at least one selected from a group consisting of a first feature of the subterranean formation in the first structurally restored domain and a second feature of the subterranean formation in the second structurally restored domain, and
wherein the first and second features comprise at least one selected from a group consisting of a fault, a horizon, and a stratigraphic deposition layer.

5. The method of claim 2,
wherein determining the first layer mapping comprises identifying a top reference surface in the first structurally restored domain for generating the first restored layer,
wherein displacing the plurality of sampling positions thereof based on the first layer mapping comprises:
  extending a plurality of spaced sampling traces between a top surface and a bottom surface of the first interpreted layer to traverse the first portion of the seismic data in the structural domain; and
  relocating, without interpolation, the first portion of the seismic data traversed by each of the plurality of spaced sampling traces according to parallel shifting of the plurality of the spaced sampling traces from the top surface in the structural domain to the top reference surface in the first structurally restored domain.

6. The method of claim 5,
wherein determining the first layer mapping further comprises identifying mapped sampling positions on the top reference surface in the first structurally restored domain corresponding to at least a portion of seismic data sampling positions on the top surface in the structural domain,
wherein the plurality of spaced sampling traces are extended starting from the seismic data sampling positions on the top surface and ending at the seismic data sampling positions on the bottom surface in the structural domain, and
wherein at least a portion of the plurality of spaced sampling traces are parallel shifted from the seismic data sampling positions on the top surface to the mapped sampling positions on the top reference surface.

7. The method of claim 6,
wherein determining the first layer mapping further comprises:
  identifying a fault line portion of the top surface and a fault line portion of the bottom surface;
wherein relocating the first portion of the seismic data traversed by each of the plurality of spaced sampling traces comprises:
  concatenating seismic data traversed by a first spaced sampling trace starting from a first sampling position on the fault line portion of the top surface and seismic data traversed by a second spaced sampling trace ending on a second sampling position on the fault line portion of the bottom surface based on joining the first and the second sampling positions.

8. The method of claim 7,
wherein determining the first layer mapping comprises identifying a bottom reference surface in the first structurally restored domain for generating the first restored layer, and
wherein displacing the plurality of sampling positions thereof based on the first layer mapping further comprises:
  determining, as a result of the parallel shifting, a relocated bottom surface in the first structurally restored domain corresponding to the bottom surface in the structural domain; and further relocating the first portion of the seismic data traversed by each of the plurality of spaced sampling traces based on a proportional conversion along a direction of the spaced sampling traces to align the relocated bottom surface to the bottom reference surface.

9. A system for performing seismic interpretation of a subterranean formation, comprising:
a display device configured to display seismic data in a structural domain representing interaction of seismic wave propagation with a plurality of geological layers in the subterranean formation, wherein the plurality of geological layers comprises deformations caused by a plurality of structural events;
a seismic interpretation module executing on a processor and configured to perform, in response to displaying the seismic data, seismic interpretation to identify a first portion of the seismic data relating to the first geological layer of the plurality of geological layers, wherein the first portion of the seismic data is designated as a first interpreted layer;
a structural restoration module executing on the processor and configured to perform a first structural restoration by:
determining a first layer mapping based on an effect of the deformations on the first interpreted layer, wherein the effect comprises at least one selected from a group consisting of a faulting effect, a folding effect, and an erosion effect;
generating a first restored layer by applying the first layer mapping to the first interpreted layer for removing the effect of the deformations on the first interpreted layer, wherein removing the effect comprises at least one selected from a group consisting of unfaulting the first interpreted layer, unfolding the first interpreted layer, and restoring an eroded surface back to the first interpreted layer;
determining a first de-compaction mapping based on a compaction effect of the first geological layer on a first remaining portion of the seismic data corresponding to geological layers beneath the first geological layer in the plurality of geological layers; and
generating first de-compacted seismic data by applying the first de-compaction mapping to the first remaining portion of the seismic data for removing the compaction effect of the first geological layer; and
memory storing instructions, when executed by the processor, comprising functionality to generate a first structurally restored domain by applying the first layer mapping and the first de-compaction mapping to the structural domain,
wherein the display device is further configured to display first converted seismic data in the first structurally restored domain representing the subterranean formation at a first geologic time corresponding to a time of deposition of a first geological layer, wherein the first converted seismic data comprises the first restored layer and the first de-compacted seismic data.

10. The system of claim 9,
wherein the seismic interpretation module is further configured to perform, in response to displaying the first converted seismic data, the seismic interpretation to identify a portion of the first converted seismic data relating to a second geological layer of the plurality of geological layers, wherein the portion of the first converted seismic data is designated as a second interpreted layer,
wherein the structural restoration module is further configured to perform a second structural restoration by:
determining a second layer mapping based on an effect of the deformations on the second interpreted layer;
generating a second restored layer by applying the second layer mapping to the second interpreted layer for removing the effect of the deformations on the second interpreted layer;
determining a second de-compaction mapping based on a compaction effect of the second geological layer on a remaining portion of the first converted seismic data corresponding to geological layers beneath the second geological layer in the plurality of geological layers; and
generating a second de-compacted seismic data by applying the second de-compaction mapping to the remaining portion of the first converted seismic data for removing the compaction effect of the second geological layer;
wherein the instructions when executed by the processor further comprise functionality to:
generate a second structurally restored domain by applying the second layer mapping and the second de-compaction mapping to the first structurally restored domain, and
wherein the display device is further configured to display second converted seismic data in the second structurally restored domain representing at least the subterranean formation at a second geologic time corresponding to a time of deposition of the second geological layer, wherein the second converted seismic data comprises the second restored layer and the second de-compacted seismic data.

11. The system of claim 10, wherein the second converted seismic data further comprises the first restored layer, wherein the seismic interpretation module is further configured to:
perform, in response to displaying the second converted seismic data, at least one selected from a group consisting of an adjustment of previous seismic interpretation and additional seismic interpretation,
wherein adjustment of previous seismic interpretation comprises adjustment of at least one selected from a group consisting of the first interpreted layer and the second interpreted layer,
wherein the additional seismic interpretation identifies of at least one selected from a group consisting of a first feature of the subterranean formation in the first structurally restored domain and a second feature of the subterranean formation in the second structurally restored domain, and
wherein the first and second features comprise at least one selected from a group consisting of a fault, a horizon, and a stratigraphic deposition layer.

12. The system of claim 11, wherein the seismic interpretation module is further configured to:
selectively adjusting at least one selected from a group consisting of the first interpreted layer and the first restored layer in response to at least one selected from a group consisting of identifying the first feature and identifying the second feature.

13. A non-transitory computer readable storage medium storing instructions for performing seismic interpretation of a subterranean formation, the instructions when executed causing a processor to:
display seismic data in a structural domain representing an interaction of seismic wave propagation with a plurality of geological layers in the subterranean formation, wherein the plurality of geological layers comprises deformations caused by a plurality of structural events;

perform, in response to displaying the seismic data, seismic interpretation to identify a first portion of the seismic data relating to a first geological layer of the plurality of geological layers, wherein the first portion of the seismic data is designated as a first interpreted layer;

perform a first structural restoration by:
  determining a first layer mapping based on an effect of the deformations on the first interpreted layer;
  generating a first restored layer by applying the first layer mapping to the first interpreted layer for removing the effect of the deformations on the first interpreted layer;
  determining a first de-compaction mapping based on a compaction effect of the first geological layer on a first remaining portion of the seismic data corresponding to geological layers beneath the first geological layer in the plurality of geological layers; and
  generating first de-compacted seismic data by applying the first de-compaction mapping to the first remaining portion of the seismic data for removing the compaction effect of the first geological layer;

generate a first structurally restored domain by applying the first layer mapping and the first de-compaction mapping to the structural domain; and display first converted seismic data in the first structurally restored domain representing the subterranean formation at a first geologic time corresponding to a time of deposition of the first geological layer, wherein the first converted seismic data comprises the first restored layer and the first de-compacted seismic data.

14. The non-transitory computer readable storage medium of claim 13,
  wherein the effect of the deformations comprises at least one selected from a group consisting of a faulting effect and a folding effect, and
  wherein applying the first layer mapping to the first interpreted layer comprises at least one selected from a group consisting of interpolating the first portion of the seismic data and displacing a plurality of sampling positions thereof based on the first layer mapping, and
  wherein applying the first de-compaction mapping to the first remaining portion of the seismic data comprises at least one selected from a group consisting of interpolating the first remaining portion of the seismic data and displacing a plurality of sampling positions thereof based on the first de-compaction mapping.

15. The non-transitory computer readable storage medium of claim 13, the instructions when executed further causing the processor to:
  perform, in response to displaying the first converted seismic data, the seismic interpretation to identify a portion of the first converted seismic data relating to a second geological layer of the plurality of geological layers, wherein the portion of the first converted seismic data is designated as a second interpreted layer;
  perform a second structural restoration by:
    determining a second layer mapping based on an effect of the deformations on the second interpreted layer;
    generating a second restored layer by applying the second layer mapping to the second interpreted layer for removing the effect of the deformations on the second interpreted layer;
    determining a second de-compaction mapping based on a compaction effect of the second geological layer on a remaining portion of the first converted seismic data corresponding to geological layers beneath the second geological layer in the plurality of geological layers; and
    generating a second de-compacted seismic data by applying the second de-compaction mapping to the remaining portion of the first converted seismic data for removing the compaction effect of the second geological layer;
  generate a second structurally restored domain by applying the second layer mapping and the second de-compaction mapping to the first structurally restored domain; and
  display second converted seismic data in the second structurally restored domain representing at least the subterranean formation at a second geologic time corresponding to a time of deposition of the second geological layer, wherein the second converted seismic data comprises the second restored layer and the second de-compacted seismic data.

16. The non-transitory computer readable storage medium of claim 15, wherein the second converted seismic data further comprises the first restored layer, the instructions when executed further causing the processor to:
  perform, in response to displaying the second converted seismic data, at least one selected from a group consisting of an adjustment of previous seismic interpretation and additional seismic interpretation,
  wherein adjustment of previous seismic interpretation comprises adjustment of at least one selected from a group consisting of the first interpreted layer and the second interpreted layer,
  wherein the additional seismic interpretation identifies of at least one selected from a group consisting of a first feature of the subterranean formation in the first structurally restored domain and a second feature of the subterranean formation in the second structurally restored domain, and
  wherein the first and second features comprise at least one selected from a group consisting of a fault, a horizon, and a stratigraphic deposition layer.

17. The non-transitory computer readable storage medium of claim 14,
  wherein determining the first layer mapping comprises identifying a top reference surface in the first structurally restored domain for generating the first restored layer,
  wherein displacing the plurality of sampling positions thereof based on the first layer mapping comprises:
    extending a plurality of spaced sampling traces between a top surface and a bottom surface of the first interpreted layer to traverse the first portion of the seismic data in the structural domain; and
    relocating, without interpolation, the first portion of the seismic data traversed by each of the plurality of spaced sampling traces according to parallel shifting of the plurality of the spaced sampling traces from the top surface in the structural domain to the top reference surface in the first structurally restored domain.

18. The non-transitory computer readable storage medium of claim 17,
  wherein determining the first layer mapping further comprises identifying mapped sampling positions on the top reference surface in the first structurally restored domain corresponding to at least a portion of seismic data sampling positions on the top surface in the structural domain, wherein the plurality of spaced sampling traces are extended starting from the seismic data sampling positions on the top surface and ending at the seismic data sampling positions on the bottom surface in the structural domain, and wherein at least a portion of the plurality of spaced sampling traces are parallel shifted from the seismic data sampling positions on the top surface to the mapped sampling positions on the top reference surface.

19. The non-transitory computer readable storage medium of claim 18, wherein determining the first layer mapping further comprises:

identifying a fault line portion of the top surface corresponding to a fault line portion of the bottom surface;

wherein relocating the first portion of the seismic data traversed by each of the plurality of spaced sampling traces comprises:

concatenating seismic data traversed by a first spaced sampling trace starting from a first sampling position on the fault line portion of the top surface and seismic data traversed by a second spaced sampling trace ending on a second sampling position on the fault line portion of the bottom surface based on joining the first and the second sampling positions.

20. The non-transitory computer readable storage medium of claim 19, wherein determining the first layer mapping comprises identifying a bottom reference surface in the first structurally restored domain for generating the first restored layer, and wherein displacing the plurality of sampling positions thereof based on the first layer mapping further comprises:

determining, as a result of the parallel shifting, a relocated bottom surface in the first structurally restored domain corresponding to the bottom surface in the structural domain; and further relocating the first portion of the seismic data traversed by each of the plurality of spaced sampling traces based on a proportional conversion along a direction of the spaced sampling traces to align the relocated bottom surface to the bottom reference surface.

* * * * *